United States Patent
Horst et al.

(10) Patent No.: US 7,801,131 B2
(45) Date of Patent: Sep. 21, 2010

(54) METHOD FOR TRANSMITTING DATA IN MESSAGES VIA A COMMUNICATION LINK OF A COMMUNICATION SYSTEM, AS WELL AS A COMMUNICATION MODULE, USER OF A COMMUNICATION SYSTEM, AND COMMUNICATION SYSTEM FOR IMPLEMENTING THIS METHOD

(75) Inventors: Christian Horst, Dusslingen (DE); Franz Bailer, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 535 days.

(21) Appl. No.: 11/795,431

(22) PCT Filed: Jan. 26, 2006

(86) PCT No.: PCT/EP2006/050477
§ 371 (c)(1),
(2), (4) Date: Jul. 16, 2007

(87) PCT Pub. No.: WO2006/079651
PCT Pub. Date: Aug. 3, 2006

(65) Prior Publication Data
US 2008/0137679 A1  Jun. 12, 2008

(30) Foreign Application Priority Data
Jan. 31, 2005   (DE) ................ 10 2005 004 464

(51) Int. Cl.
*H04L 12/28* (2006.01)
*H04L 12/54* (2006.01)
*G06F 3/00* (2006.01)
*G06F 13/00* (2006.01)

(52) U.S. Cl. .................. 370/389; 370/428; 710/52; 711/154

(58) Field of Classification Search .............. 370/428, 370/389; 710/52–57; 711/154, 156
See application file for complete search history.

(56) References Cited

U.S. PATENT DOCUMENTS 3,908,092 A * 9/1975 Hight et al. ............ 370/381

(Continued)

FOREIGN PATENT DOCUMENTS

DE        102 15 719       10/2003

(Continued)

*Primary Examiner*—Alpus H Hsu
*Assistant Examiner*—Saad Hassan
(74) *Attorney, Agent, or Firm*—Kenyon & Kenyon LLP

(57) ABSTRACT

A method for transmitting data in messages via a communication link of a communication system, as well as a communication module, users of a communication system and a communication system for implementing this method. The messages are transmitted cyclically in specifiable time windows via the communication link, messages sent and to be sent via the communication link initially being stored temporarily in a message memory of a communication module, and the message to be sent or to be received in a current time window being taken from the message memory and sent, or received and stored in the message memory. To improve the real-time capability of the communication module, it is provided that to ascertain the positions of the messages in the message memory, it is searched in advance at regular intervals for, in each instance, a plurality of time windows still following, and as the result of a search run, the positions of the messages to be sent or to be received in the plurality of time windows still following are stored in a buffer assigned to the message memory. Within the course of the actual data transmission, which includes sending or receiving of messages, the buffer is simply accessed, and via the positions stored there, the matching message objects are accessed in the message memory.

21 Claims, 14 Drawing Sheets

U.S. PATENT DOCUMENTS

| | | | | |
|---|---|---|---|---|
| 4,521,880 A * | 6/1985 | Orsic | ................. | 370/376 |
| 5,884,040 A * | 3/1999 | Chung | ................. | 709/227 |
| 6,311,212 B1 | 10/2001 | Chong et al. | | |
| 6,658,154 B2 * | 12/2003 | Kohiyama et al. | ......... | 382/233 |
| 2003/0225983 A1 * | 12/2003 | Habben et al. | ............ | 711/154 |
| 2006/0004934 A1 * | 1/2006 | Guldner et al. | ............ | 710/52 |
| 2006/0224394 A1 * | 10/2006 | Ungermann et al. | ......... | 705/1 |
| 2009/0013106 A1 * | 1/2009 | Guldner et al. | ............ | 710/52 |

FOREIGN PATENT DOCUMENTS

| | | |
|---|---|---|
| RU | 2004 116904 | 11/2005 |
| WO | 2004/098955 | 11/2004 |

\* cited by examiner

METHOD FOR TRANSMITTING DATA IN MESSAGES VIA A COMMUNICATION LINK OF A COMMUNICATION SYSTEM, AS WELL AS A COMMUNICATION MODULE, USER OF A COMMUNICATION SYSTEM, AND COMMUNICATION SYSTEM FOR IMPLEMENTING THIS METHOD

FIELD OF THE INVENTION

The present invention relates to a method for transmitting data in messages that are transmitted cyclically in specifiable time windows via a communication link of a communication system. Messages sent and to be sent via the communication link are initially stored temporarily in a message memory of a communication module. The message to be sent or to be received by a user in a current time window is taken from the message memory and sent, or received and stored in the message memory. The present invention also relates to a communication module, a user of a communication system and a communication system for implementing this method.

BACKGROUND INFORMATION

The networking of users, e.g., in the form of control units, sensor systems and actuator systems with the aid of a communication link of a communication system has increased dramatically in recent years in the construction of modern motor vehicles or also in machine construction, especially in the field of machine tools, thus in automation as well. In this context, synergistic effects may be achieved by the distribution of functions to a plurality of users. These are called distributed systems. Increasingly, the communication between the various users is taking place via a communication link, in the form of a data bus, of a communication system configured as a bus system. Communication traffic on the bus system, access and reception mechanisms, as well as error handling are regulated by a protocol. One known protocol for this purpose is the CAN (Controller Area Network) protocol or also the TTCAN (Time Triggered CAN) protocol, as well as the FlexRay protocol, the FlexRay protocol specification v2.1 presently being the basis.

FlexRay is a rapid, deterministic and fault-tolerant bus system, particularly for use in a motor vehicle. The FlexRay protocol operates according to the method of Time Division Multiple Access (TDMA), in which the users (or components), or the messages to be transmitted, are assigned fixed time slots or time windows in which they have an exclusive access to the communication link. This is comparably implemented in the case of the TTCAN as well. In this context, the time slots repeat in a fixed cycle, the so-called communication cycle, so that the instant at which a message is transmitted via the data bus can be predicted exactly, and the bus access takes place deterministically.

To optimally utilize the bandwidth for the transmission of messages on the bus system, FlexRay subdivides the communication cycle into a static part, the so-called static segment, and a dynamic part, the so-called dynamic segment. The time slots having a length predefined in a fixed manner are in the static part at the beginning of a bus cycle. In the dynamic part, the time slots are assigned dynamically. Therein, the exclusive bus access in each case is permitted for only a brief time, so-called minislots. Only if one of the users accesses the bus within a minislot is the corresponding time slot lengthened to the time duration needed for the data transmission by the user. Consequently, bandwidth is thus only used up if it is also actually needed for transmitting data. The dynamic segment may be used for event-driven data transmission.

In a FlexRay communication system, communication takes place via two physically separate lines, also known as channels, with a data rate in each instance of 10 MB per second maximum at present. The two channels correspond to the physical layer, in particular of the OSI (open system architecture) layer model. They are used chiefly for the redundant and therefore fault-tolerant transmission of messages, but can also transmit different messages, whereby at present the data rate can then be doubled to 20 MB. However, FlexRay can, of course, be operated with lower data rates as well.

To realize synchronous functions and to optimize the bandwidth by small spacings between two messages, the distributed components in the communication network, thus the users in the communication system, need a common time base, the so-called global time. The users have their own local clocks, which are synchronized to the global time. Synchronization messages are transmitted in the static part of the cycle for synchronizing the clocks. The clocks are synchronized at the end of each communication cycle during the so-called network idle time (NIT). With the aid of a special algorithm corresponding to the FlexRay specification, the local clock times of the components are corrected so that all local clocks run in synchronization with a global clock. This synchronization is accomplished comparably in a TTCAN network as well.

A FlexRay user, also known as a FlexRay network node, contains a user processor, thus a host processor, a FlexRay controller or communication controller, a connection to the physical layer, the bus driver (BD), as well as a bus guardian (BG) when implementing a bus monitoring. The host processor furnishes and processes the data which are transmitted and received via the FlexRay communication controller. Messages or message objects can be configured with, e.g., up to 254 data bytes for communication in a FlexRay network. A communication module, in particular a communication controller, is now used to transmit these messages or message objects between the physical layer, thus the communication link, and the host processor.

The communication module has a message memory in which message objects to be sent by a user assigned to the communication module or message objects to be received by the user are stored temporarily before they are relayed to the communication link for sending, or to the host processor for further processing. The number and size of the data fields of the message memory are configured during a configuration phase or reconfiguration phase of the communication system.

In the related art, the message memory is searched by a message handler at the beginning of each time slot in order to ascertain those data fields in which messages, which are to be sent or received via the active channel in the current communication cycle and/or in the current time slot, are stored or still to be stored. Thus, when searching the message memory, for instance, a data field is ascertained which is provided for a message that is intended to be received in the current communication cycle and in the current time slot via the active channel considered. After the message is received, it is then stored in the data field ascertained. In the same way, when searching the message memory, for instance, a data field may be ascertained in which a message is stored that is intended to be sent in the current communication cycle and in the current time slot via the active channel considered. This message is then taken from the data field ascertained and relayed to the communication link for sending.

However, it has proven to be disadvantageous that the search run takes up a relatively great amount of time, particularly in the case of larger message memories, and delays may occur in receiving or sending messages due to the search run. Because the entire message memory is searched in each time slot, the real-time capability of the communication system may be impaired.

SUMMARY OF THE INVENTION

Therefore, an object of the present invention is to develop the search run through the message memory in such a way that the transmission of messages is supported in optimal manner, and in particular, the real-time capability of the communication system can still be ensured, even in the case of larger message memories.

To achieve this objective, starting from the data-transmission method of the type indicated at the outset, it is provided that, to ascertain the positions of the messages in the message memory, it is searched in advance at regular intervals for, in each instance, a plurality of time windows still following, and that as the result of a search run, the positions of the messages to be sent or to be received in the plurality of time windows still following are stored in a buffer assigned to the message memory.

Thus, according to the present invention, the message memory is not completely searched in each time slot, but rather a search run is performed for a plurality of future time slots. That is to say, using a single search run, the positions of the messages in the message memory are ascertained for a plurality of future time slots. The positions ascertained in the course of the search run are stored in a buffer, and can be retrieved from the buffer nearly without a time delay later in the course of the actual data transmission. Thus, a complete search run through the entire message memory is not necessary in the course of the actual data transmission. This permits a decisive improvement in the real-time capability of the communication system according to the present invention.

According to one advantageous further refinement of the present invention, within the course of the data transmission, the message to be transmitted in the current time window via the communication system is read out from the message-memory position indicated in the buffer for this time window, and transmitted via the communication link, or the message transmitted in the current time window via the communication link is stored at the message-memory position indicated in the buffer for this time window. Thus, when a message from the message memory is to be sent within the course of the actual data transmission, the corresponding location in the buffer is simply accessed, the message-memory position stored in the buffer is then accessed, the message stored there is removed and is relayed to the communication link for sending. In the same way, when, in the course of the actual data transmission, a message is to be received and stored in the message memory, the corresponding location can simply be accessed in the buffer, and the message received via the communication link can be stored at the message-memory position stored in the buffer.

According to one specific embodiment of the present invention, the data transmission for the current time window and the subsequent plurality of time windows for which the positions of the messages in the message memory were already stored in the buffer, is carried out in time with the search run for the time window following the last time window of the data transmission and for the subsequent plurality of time windows. Thus, this means that the actual data transmission for the future time slots 1 ... n (n>1) and the search run for the subsequent future time slots (n+1) ... 2n proceed concurrently (in parallel). For this specific embodiment, the status memory (buffer) is selected to be large enough that it includes 2n data fields, namely, n data fields in which the positions of the messages in the message memory can be stored for the data transmission, and n further data fields in which the positions of the messages in the message memory ascertained in the course of the current search run can be stored. The positions of the messages in the message memory for the actual data transmission may be ascertained in the preceding search run and were stored in the buffer. The two n data fields in the buffer may be accessed by turns, each of the n data fields being used once for storing the positions within the course of the search run, and then for the retrieval of the stored positions within the course of the actual data transmission, the two n data fields never being used simultaneously within the course of a search run or a data transmission, but rather always staggered relative to each other. In addition, using this specific embodiment, it is possible to save on processing time for the search run, so that the real-time capability of the communication system is virtually always present. The search run may be coordinated and carried out by a separate processing unit, e.g., a so-called finite state machine.

Advantageously, the number of the plurality of time windows of the search run is the same as the number of the plurality of time windows for the actual data transmission. Thus, if according to the method of the present invention, data are to be transmitted (received or sent), a search run is carried out for a plurality of future time slots in succession, and then the actual data transmission (sending or receiving data) is carried out. If the actual data transmission for a plurality of future time slots and the search run for a plurality of time slots still further in the future are carried out by turns and concurrently, it is necessary that the number of future time slots for which the actual data transmission is carried out and for which the search run is carried out are the same, so that it is possible to switch between the two storage areas of the buffer, in each case including a number of data fields corresponding to the number of future time slots.

Therefore, it is provided that the buffer be subdivided, the positions of the messages for the current time window and the subsequent plurality of time windows for which positions in the message memory were already stored in the buffer being stored in a first part of the buffer for the data transmission, and the positions of the messages for the time window following the last time window of the data transmission and for the subsequent plurality of time windows being stored in a second part of the buffer for a search run.

According to another advantageous development of the invention, first data having a first scope of data and second data having a second scope of data are contained in the messages to be stored in the message memory, and the first data are stored in a header segment of the message memory in one header area each per message, and the second data are stored in a data segment in one data area each per message. The subdivision of the message memory into header segment and data segment, as well as the number and size of the data areas in the data segment, may be accomplished in variable fashion in the course of configuring the message memory in accordance with the requirements. Several advantages are thereby obtained: Thus, in programming, the user is able to decide whether he/she would like to use a larger number of messages with a small data field or a smaller number of messages with a large data field. In the configuration of messages having a data area of variable size, the available memory is optimally utilized. The user has the possibility of utilizing one data area jointly for different messages. In the implementation of the communication controller, thus the communication module, on an integrated circuit, it is possible to exactly adapt the size of the message memory to the requirements of the application by adjusting the memory depth of the memory used, especially a RAM memory, without altering the other functions of the communication controller or communication module.

The message memory is configured merely via the header segment. The channel, the cycle and the time slot in which the message is to be transmitted (received or sent) are established for the messages in the header areas. In addition, within the framework of the configuration, for each message it is possible to establish the size of the data part in the data segment of the message memory, a pointer to the beginning of the data part, and information as to whether it is a message to be sent or a message to be received.

According to a further refinement of the invention, one identifier per message is stored in the header area of the message memory, the identifier identifying the specific message, and permitting the message to be assigned to a specific communication cycle and a specific time window within the cycle. The part of the header area in which the identifier is stored is also known as the identification field.

Advantageously, two fields are provided in the buffer for each of the messages considered during a search run and to be sent or received in one of the plurality of time windows still following, a pointer to the corresponding position of the message stored in the message memory being stored in a first field, and a status of the message stored in the message memory being stored in a second field. The pointer may point to first data, stored in a header area in the header segment, of the message stored in the message memory.

As status of the message stored in the message memory, information as to whether a message is to be received or to be sent at all for the time window being considered ('empty') and/or whether the message is to be sent ('tx_buf') or to be received ('rx_buf'), may be stored in the buffer. If the message is neither to be sent nor to be received, the status is set to 'empty'.

Given the FlexRay specification v2.1 valid at present, and the hardware and software components presently available for implementing a FlexRay communication system, it is particularly advantageous if, to ascertain the positions of the messages in the message memory, the message memory is searched in advance at regular intervals for, in each instance, four time windows yet to follow, and the positions of the messages to be sent or to be received in the four time windows still following are stored in the buffer as the result of a search run. Naturally, the search run may also be carried out in advance for only two, or else also for more than four time slots. The number of time slots for which the search run is carried out in advance may be a number from the quantity $2^x$, x being a whole natural number greater than 1. Therefore, the result for the number of time slots may be: 2, 4, 8, 16, 32, . . . .

According to one specific embodiment of the invention, in the course of a search run, the message memory is searched for the plurality of time windows still following, according to one or more of the following criteria:
Ascertaining whether messages for a contemplated transmission channel are stored in the message memory;
Ascertaining whether messages for a contemplated communication cycle are stored in the message memory;
Ascertaining whether messages for the plurality of time windows still following are stored in the message memory; and
Determining whether the ascertained messages are messages to be sent or messages to be received.

If messages to be sent are found in the course of the search run through the message memory for the currently considered channel (channel A or channel B), for the current communication cycle and for the future time slots considered, 'Tx_buf' is stored in the buffer at the location corresponding to the time slot considered. If data fields for messages to be received are found in the course of the search run in the message memory for the currently considered channel (channel A or channel B), for the current communication cycle and for the future time slots considered, 'Rx_buf' is stored in the buffer at the location corresponding to the time slot considered. If, in the course of the search run in the message memory for the currently considered channel (channel A or channel B), for the current communication cycle and for the future time slots considered, neither a message to be sent nor a data field for a message to be received is found, 'empty' is placed in the buffer at the location corresponding to the time slot considered, in the event it was not already placed there before the beginning of the search run.

Within the course of the search run, the following indicated information of the messages stored in the message memory is queried:
CH A, CH B: to determine whether the channel for which the message is provided corresponds to the channel considered,
Cycle code: to determine whether the communication cycle for which the message is provided corresponds to the communication cycle considered,
Frame ID: to determine whether the time slot for which the message is provided corresponds to the current time slot, and
TXM (transmission mode): to determine whether the message is provided for sending (TXM=1) or for receiving (TXM=0).

The information to be queried may be contained in the indicated status bits (CH A, CH B, cycle code, TXM) as part of the first data in the header areas in the header segment of the message memory.

In an exemplary embodiment of the present invention for attaining the object of the present invention, starting from the communication module of the type indicated at the outset, it is provided that, to ascertain the positions of the messages in the message memory, the communication module includes a searching arrangement for searching the message memory in advance at regular intervals for, in each instance, a plurality of time windows still following, a buffer assigned to the message memory, and a storing arrangement for storing the positions of the messages, to be sent or to be received in the plurality of time windows still following, in the buffer as the result of a search run.

According to another advantageous development of the invention, the arrangement for searching the message memory and the arrangement for storing the positions of the ascertained messages in the buffer take the form of a finite state machine.

According to one specific embodiment of the invention, the communication module is configured as a FlexRay communication module for the receiving, sending and buffering of messages transmitted according to a FlexRay specification.

The arrangement for searching the message memory and the arrangement for storing the positions of the ascertained messages in the buffer are advantageously designed for implementing a method as recited in one of Claims 2 through 12.

In another exemplary embodiment of the present invention for attaining the object of the present invention, starting from the user of the communication system of the type indicated at the outset, it is provided that, to ascertain the positions of the messages in the message memory, the communication module includes a searching arrangement for searching the message memory in advance at regular intervals for, in each instance, a plurality of time windows still following, a buffer assigned to the message memory, and a storing arrangement for storing the positions of the messages, to be sent or to be received in the plurality of time windows still following, in the buffer as the result of a search run.

According to one advantageous development of the invention, the user includes a host computer which, together with the communication module, is integrated on a shared semiconductor component. The host computer may be in the form of a microprocessor.

According to one specific embodiment of the invention, the communication module is designed according to one of the embodiments described herein.

Finally, as a further way for attaining the object of the present invention, starting from the communication system of the type indicated at the outset, it is provided that, to ascertain the positions of the messages in the message memory, the communication module includes a searching arrangement for searching the message memory in advance at regular intervals for, in each instance, a plurality of time windows still following, a buffer assigned to the message memory, and a storing arrangement for storing the positions of the messages, to be sent or to be received in the plurality of time windows still following, in the buffer as the result of a search run.

According to one further advantageous refinement of the invention, the communication module is designed according to one of the embodiments described herein.

DETAILED DESCRIPTION

Figure 1:
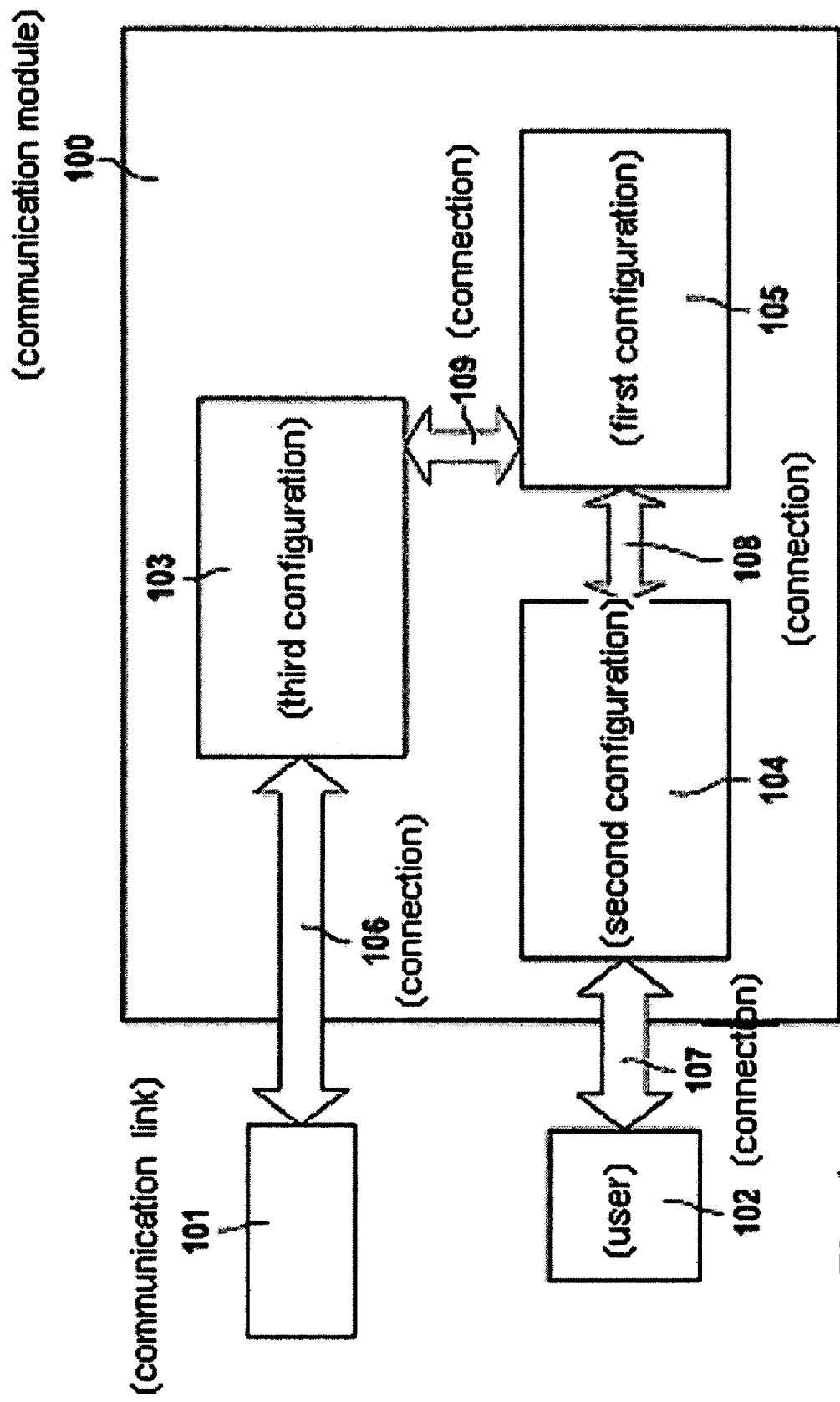
FIG. 1 shows a schematic representation of a communication module and its connection to the communication link and the user.

FIG. 1 shows schematically a FlexRay communication module 100 for connecting a user or host 102 to a FlexRay communication link 101, thus to the physical layer of the FlexRay communication system. Communication module 100 is also known as a FlexRay IP module or E-Ray controller. Viewed functionally, communication module 100 includes a FlexRay communication controller. FlexRay communication module 100 is connected via a connection 107 to the user or user processor 102 (also host processor), and via a connection 106 to communication link 101. For problem-free connection first of all with respect to transmission times, and secondly with respect to the data integrity, essentially three configurations are schematically differentiated in FlexRay communication module 100.

A first configuration 105 is used for storage, especially the temporary storage of at least a portion of the messages to be transmitted, i.e., to be sent or to be received by user 102. Between user 102 and this first configuration 105, a second configuration 104 is connected via connections 107 and 108. In the same way, a third configuration 103 is connected via connections 106 and 109 between communication link 101 and first configuration 105, a very flexible input and output of data as part of messages, particularly FlexRay messages into and out of first configuration 105 thereby being attainable at optimal speed, while ensuring the data integrity.

Figure 2:
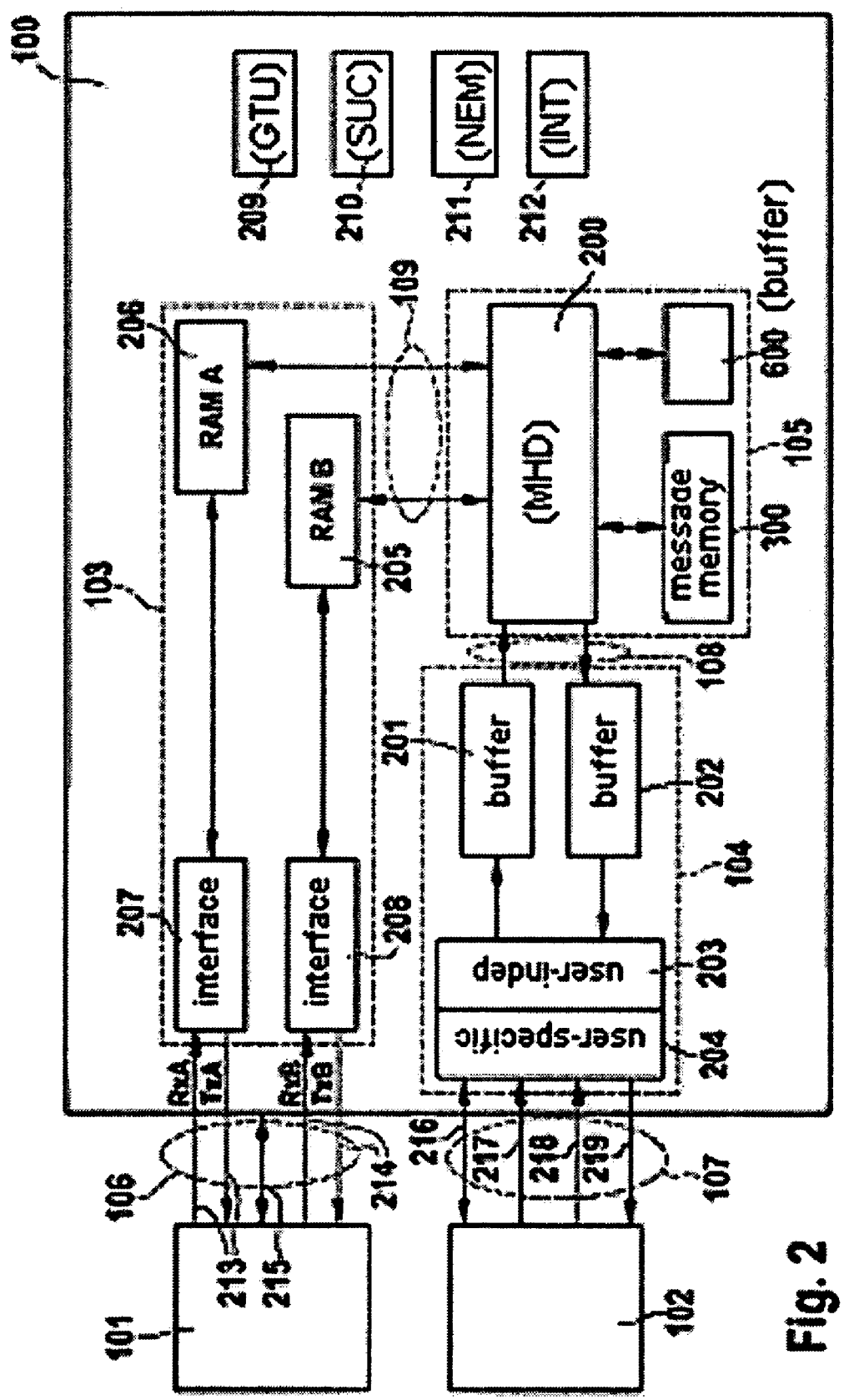
FIG. 2 shows a special specific embodiment of the communication module from FIG. 1, as well as its connection in detail.

FIG. 2 shows communication module 100 in somewhat greater detail in a preferred specific embodiment. Respective connections 106 through 109 are shown in greater detail as well. In this case, second configuration 104 includes an input buffer (IBF) 201, an output buffer (OBF) 202, as well as an interface module made up of two parts 203 and 204, the one sub-module 203 (generic CPU interface, GIF) being user-independent, and second sub-module 204 being user-specific. User-specific sub-module 204 (customer CPU interface CIF) connects a user-specific host CPU 102, thus a customer-specific user, to the remaining FlexRay communication module 100. To that end, a bidirectional data line 216, an address line 217 and a control input 218 are provided. An interrupt output denoted by 219 is likewise provided.

User-specific sub-module 204 is connected to a user-independent sub-module 203; that is, FlexRay communication module 100 has a generic, thus general CPU interface, to which a large number of different customer-specific host CPUs can be connected via corresponding user-specific sub-modules 204, thus customer CPU interfaces CIF. In this manner, only user-specific sub-module 204 has to be varied depending on the user, while remaining communication module 100 can always be constructed the same regardless of the user, which means a considerably lower expenditure. For example, user-specific sub-module 204 adapts the number of bits of FlexRay communication module 100 that can be transmitted or processed simultaneously (e.g., 16 bits) to the number of bits of connected host CPU 102 that can be transmitted or processed simultaneously (e.g., 8, 16 or 32 bits).

Input buffer 201 and output buffer 202 may be formed in one common memory module or else in separate memory modules. Input buffer 201 is used for the buffer storage of messages for transmission from host CPU 102 to message memory 300. Input buffer 201 is preferably designed in such a way that it is able to store two complete messages, each made up of a header segment HS, in particular having configuration data, and a data segment DS or payload segment. Input buffer 201 is in two parts (partial buffer and shadow memory), which means that transmission between user CPU 102 and message memory 300 can be accelerated by writing the two parts of input buffer 201 by turns, i.e., by alternating access.

In the same way, output buffer (OBF) 202 is used for the buffer storage of messages for transmission from message memory 300 to user CPU 102. Output buffer module 202 is also configured in such a way that two complete messages made up of header segment HS, particularly having configuration data, and data segment DS, thus payload segment, are able to be stored. Here, as well, output buffer 202 is subdivided into two parts, a partial buffer and a shadow memory, which means transmission between message memory 300 and user or host CPU 102 may also be accelerated here by reading the two parts of output buffer 202 by turns, i.e., by alternating access. Second configuration 104, made up of blocks 201 through 204, is connected to first configuration 105, as shown.

Configuration 105 is made up of a message handler (MHD) 200 and message memory 300 (message RAM). Message handler 200 checks or controls the data transfer between input buffer 201 as well as output buffer 202, and message memory 300. In like manner, it checks or controls the data transmission in the other direction via third configuration 103. Message memory 300 is preferably implemented as a single-ported RAM. This RAM memory stores the messages or message objects, thus the actual data, together with configuration data and status data. The exact structure of message memory 300 is shown in greater detail in FIG. 3. Each message object is made up of a header segment HS and a data segment DS. The identification field as well as further configuration and status information KD, together with a pointer DP to the beginning of data area DB in data segment DS of message memory 300 are stored in header area HS.

Third configuration 103 is made up of blocks 205 through 208. Corresponding to the two channels A (CH A) and B (CH B) of the physical layer (FlexRay physical layer), this configuration 103 is subdivided into two data paths, each having two data directions. This becomes clear through connections 213 and 214, where the two data directions are shown for channel A—RxA for receiving and TxA for sending—as well as for channel B, RxB and TxB. An optional bidirectional control input is denoted by connection 215. Third configuration 103 is connected via a first buffer 205 for channel B and a second buffer 206 for channel A. These two buffers (transient buffer RAMs: RAM A and RAM B) are used as buffer storage for the data transmission from or to first configuration 105. Corresponding to the two channels A, B, these two buffers 205 and 206 are connected to an interface module 207 and 208, respectively, which contain the FlexRay protocol controller or bus protocol controller made up of a send/receive shift register and the FlexRay protocol finite state machine. Therefore, the two buffers 205 and 206 are used as buffer storage for the data transmission between the shift registers of the interface modules or FlexRay protocol controller 207 and 208 and message memory 300. The data fields, thus the payload segment or data segment DS of two FlexRay messages, are advantageously stored by each buffer 205 or 206 here, as well.

Also shown in communication module 100 is the global time unit (GTU), designated by 209, which is responsible for the representation of the time-slot pattern in the FlexRay, thus the microtick μT and the macrotick MT. The fault-tolerant clock synchronization of the cycle counter and the control of the time sequences in the static and dynamic segment of the FlexRay are regulated via global time unit 209, as well. Users 102 of the communication system have their own local clocks, which are synchronized to the global time. Synchronization messages are transmitted in the static portion of the communication cycle for synchronizing the clocks. The clocks are synchronized at the end of each communication cycle during the so-called network idle time (NIT). With the aid of a special algorithm corresponding to the current FlexRay specification, the local clock times of components 102 are corrected so that all local clocks run in synchronization with one global clock.

Block 210 represents the general system control (system universal control SUC) by which the operation modes of the FlexRay communication controller or of communication module 100 are checked and controlled. They include the wake-up, the startup, the reintegration or integration, normal operation and passive operation. Block 211 shows the network and error management NEM as described in the FlexRay protocol specification v2.1. Finally, block 212 shows the interrupt control (INT) which manages the status and error interrupt flags and checks or controls interrupt outputs 219 to user CPU 102. In addition, block 212 contains an absolute and a relative timer for generating the time interrupts or timer interrupts.

Message objects or messages can be configured with up to 254 data bytes in message buffer 300 for the communication in a FlexRay network or FlexRay communication system. In particular, message memory 300 is a message RAM which, for example, is able to store up to a maximum of 64 message objects. All functions which relate to the handling or management of the messages themselves are implemented in message handler 200. They are, for example, the acceptance filtering, transfer of messages between the two FlexRay protocol controller blocks 207 and 208 and message memory 300, thus the message RAM, as well as the control of the transmit sequence and the providing of configuration data and status data, respectively.

An external CPU, thus an external processor—user processor or host 102—is able to directly access the register of the FlexRay communication module via the user interface, using user-specific part 204. In this context, a plurality of registers is used. These registers are employed to configure and control the FlexRay protocol controller, thus interface modules 207 and 208, message handler (MHD) 200, global time unit (GTU) 209, system universal controller (SUC) 210, network and error management unit (NEM) 211, interrupt controller (INT) 212, as well as the access to the message RAM, thus message memory 300, and to indicate the corresponding status, as well. At least parts of these registers are discussed in greater detail in FIGS. 4 through 6 and 7 through 9. Such a described FlexRay communication module 100 according to the present invention permits easy implementation of the FlexRay specification v2.1, whereby an ASIC or a microcontroller having corresponding FlexRay functionality may easily be generated.

Figure 3:
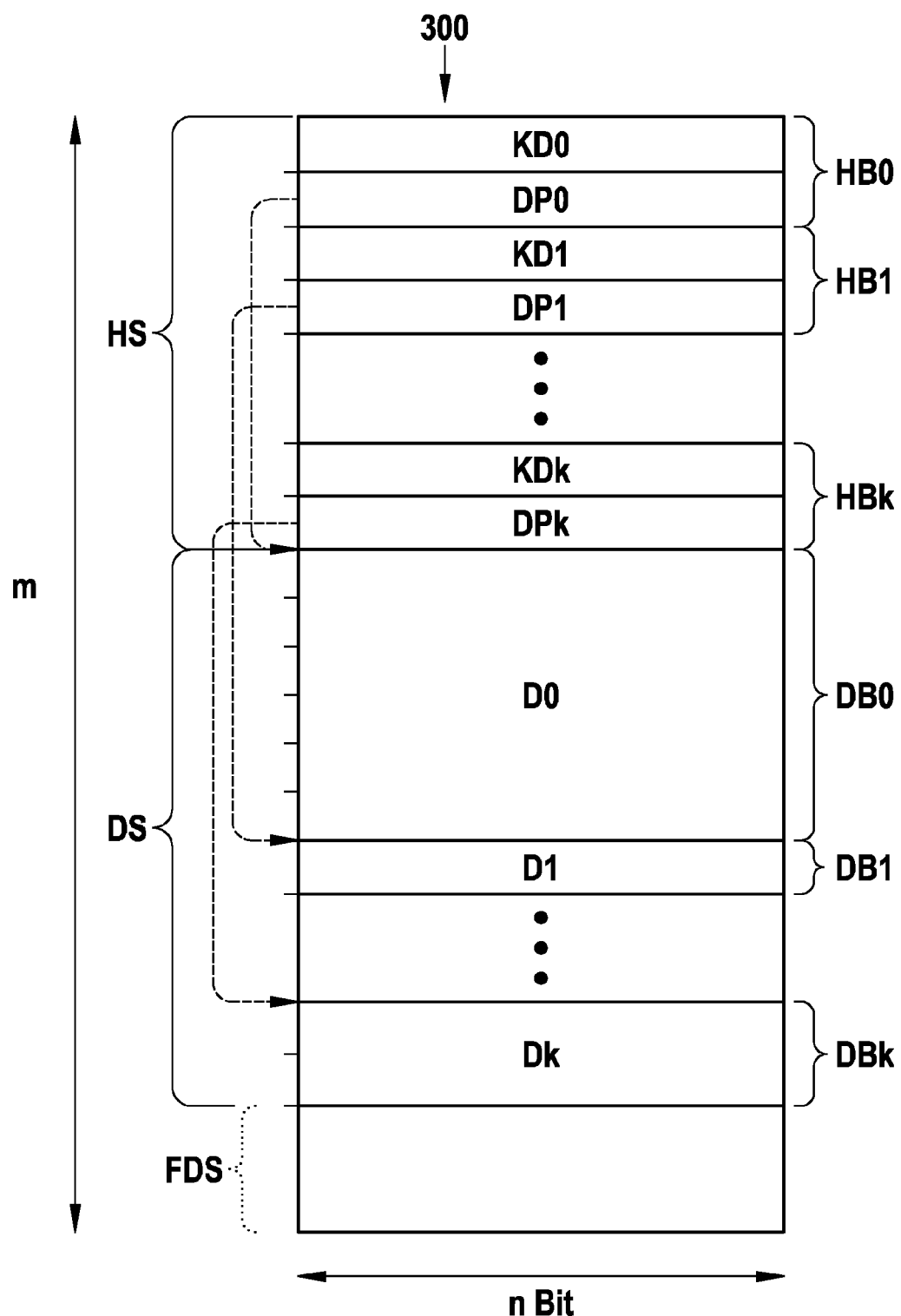
FIG. 3 shows the structure of a message memory of the communication module according to FIG. 1 or 2 in detail.

FIG. 3 shows the partitioning of message memory 300 in detail. For the functionality of a FlexRay communication controller required according to the FlexRay protocol specification, a message memory 300 is needed for holding messages ready to be transmitted (transmit buffer), as well as for storing messages received without error (receive buffer). The FlexRay protocol allows messages having a data area, thus a payload area, of 0 to 254 bytes. As FIG. 2 shows, message memory 300 is part of FlexRay communication module 100. The method described in the following, as well as corresponding message memory 300 illustrate the storage of messages to be sent and of received messages, particularly using a random access memory (RAM), the mechanism of the present invention making it possible to store a variable number of messages in a message memory 300 of predefined size. The number of messages able to be stored is a function of the size of the data areas of the individual messages, which means first of all, it is possible to minimize the size of memory 300 needed without limiting the size of the data areas of the messages, and secondly, memory 300 is optimally utilized. This variable partitioning of, in particular, a RAM-based message memory 300 for a FlexRay communication controller shall now be described in greater detail below.

For the implementation, a' message memory 300 having a stipulated word length of n bits, e.g., 8, 16, 32, etc., as well as a predefined memory depth of m words (m, n as natural numbers) is now specified by way of example. In this instance, message memory 300 is partitioned into two segments, a header segment HS and a data segment DS (payload section, payload segment). One header area HB and one data area DB are created per message. Therefore, for messages 0, 1 through k (k as natural number), header areas HB0, HB1 through HBk and data areas DB0, DB1 through DBk are created. Thus, first and second data are differentiated in a message, the first data corresponding to configuration data and/or status data with respect to the FlexRay message, and in each case being put in a header area HB (HB0, HB1, . . . , HBk). The second data, which correspond to the actual data to be transmitted (so-called payload data), are put accordingly in data areas DB (DB0, DB1, . . . , DBk). Thus, a first scope of data (measured in bits, bytes or memory words) is obtained for the first data per message, and a second scope of data (likewise measured in bits, bytes or memory words) is obtained for the second data of a message; the second scope of data may be different per message. The partition between header segment HS and data segment DS is variable in message memory 300, i.e., no predefined boundary exists between the two areas HS, DS. According to the present invention, the partition between header segment HS and data segment DS is a function of the number k of messages, as well as of the second scope of data, thus the scope of the actual payload data, of one message or of all k messages together.

In the present invention, a pointer element or data pointer DP0, DP1 through DPk is now in each case assigned directly to configuration data KD0, KD1 through KDk of the respective message. In the special embodiment, a fixed number of memory words, here two, is assigned to each header area HB0, HB1 through HBk, so that one configuration datum KD (KD0, KD1, . . . , KDk) and one pointer element DP (DP0, DP1, . . . , DPk) are always filed together in one header area HB (HB0, HB1, . . . , HBk). Following this header segment HS having header areas HB, whose size or first scope of data is a function of the number k of messages to be stored, is data segment DS for storing actual message data D0, D1 through Dk. This data segment (or data section) DS is dependent in its scope of data on the respective scope of data of the message data (payload data) stored, here, for example, six words in DB0, one word in DB1 and two words in DBk. Therefore, respective pointer elements DP0, DP1 through DPk always point to the beginning, thus at the start address of the respective data area DB0, DB1 through DBk in which data D0, D1 through Dk of respective messages 0, 1 through k are stored. Consequently, the partitioning of message memory 300 between header segment HS and data segment DS is variable and is a function of the number of messages themselves as well as the specific scope of data of one message, and therefore the entire second scope of data. If fewer messages are configured, header segment HS becomes smaller and the area becoming free in message memory 300 may be used as supplement to data segment DS for the storage of data. This variability ensures optimal storage utilization, thereby also permitting the use of smaller memories 300. Free data segment FDS, particularly its size, likewise a function of the combination of the number k of stored messages and the specific second scope of data of the messages, is therefore minimal and may even become 0.

Consequently, the following advantages result compared to a fixed partitioning of message memory 300: In programming, the user is able to decide whether he/she would like to use a larger number of messages with a small data field or a smaller number of messages with a large data field. In the configuration of messages having a data area DB of variable size, the available memory space is optimally utilized. The user has the possibility of utilizing one data-memory area jointly for different messages.

In addition to the use of pointer elements (DP0, DP1, . . . , DPk), it is also possible to store the first and second data, thus configuration data KD (KD0, KD1, KDk) and actual data D (D=D0, . . . , Dk) in a specifiable sequence, so that the sequence of header areas HB0 through HBk in header segment HS and the sequence of data areas DB0 through DBk in data segment DS are in each case identical. It could then even be possible to dispense with a pointer element. However, for this case, information about the length of individual data areas DB0 through DBk would have to be available, or else data areas DB0 through DBk would all have to be the same size.

In one special refinement, message memory 300 is assigned an error-identifier generator, particularly a parity bit generator element, and an error-identifier checker, particularly a parity bit check element, to ensure the correctness of the data stored in header segment HS and data segment DS, in that one checksum may be co-stored, especially as a parity bit, per memory word or per area (header area HB and/or data area DB). Other check identifiers, e.g., a CRC (cyclic redundancy check) or even identifiers of greater power such as ECC (error code correction) are conceivable.

When implementing the FlexRay communication controller on an integrated circuit, it is possible to adapt the size of message memory 300 to the requirements of the application by adjusting the memory depth of the memory used, without altering the other functions of the communication controller.

In the following, the host CPU access, thus writing and reading of configuration data and status data, respectively, and the actual payload data via buffer configuration 201 and 202 is now described in greater detail with reference to FIGS. 4 through 6 and 7 through 9. In so doing, the goal is to produce a decoupling with respect to the data transmission, such that the data integrity may be guaranteed, and at the same time a high transmission rate is ensured. These operations are controlled via message handler 200, which is described later in greater detail in FIGS. 10, 11 and 12.

Figure 4:
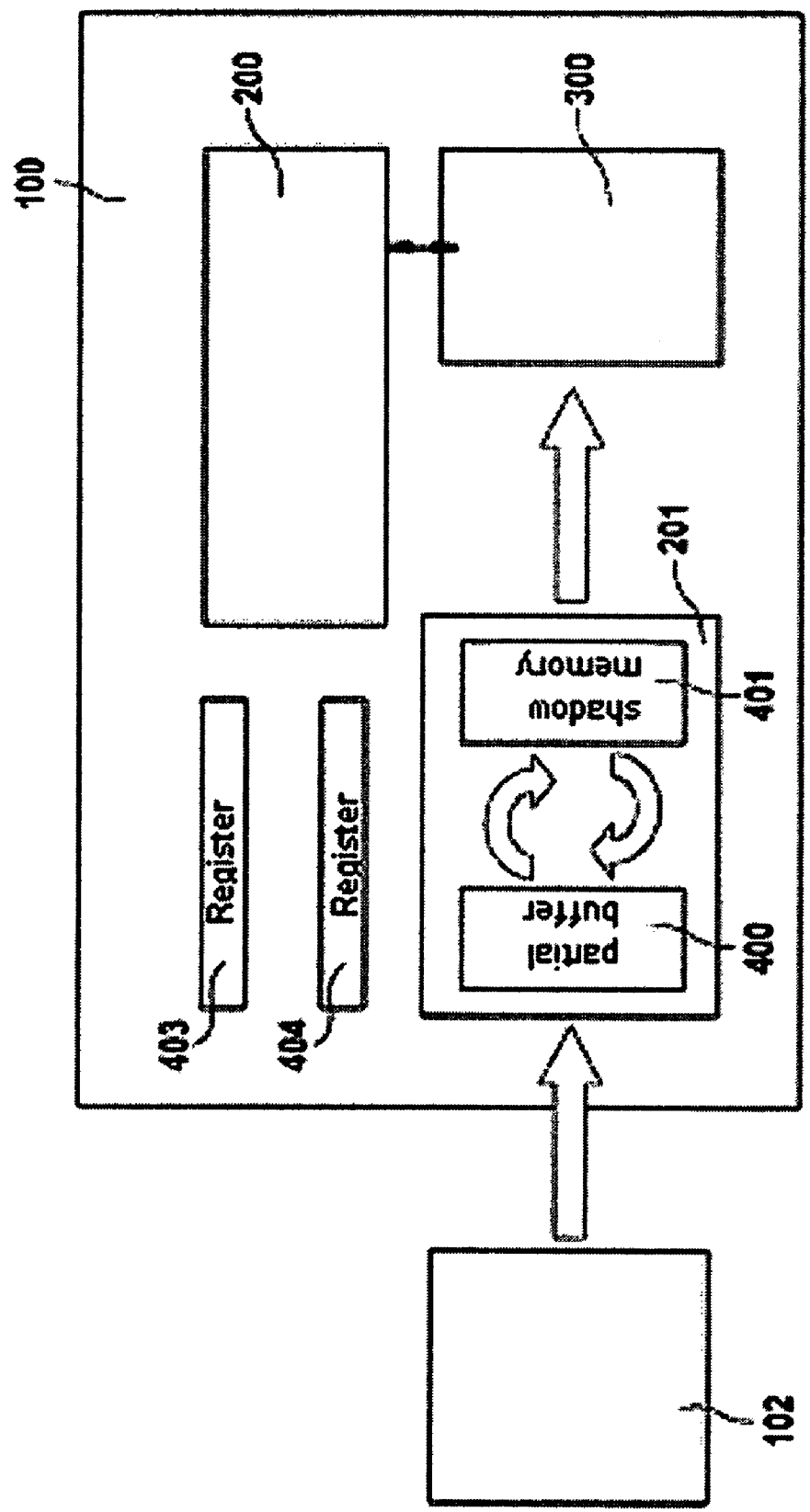
FIG. 4 shows schematically the architecture and the process of the data access in the direction from the user to the message memory, in one aspect.
Figure 5:
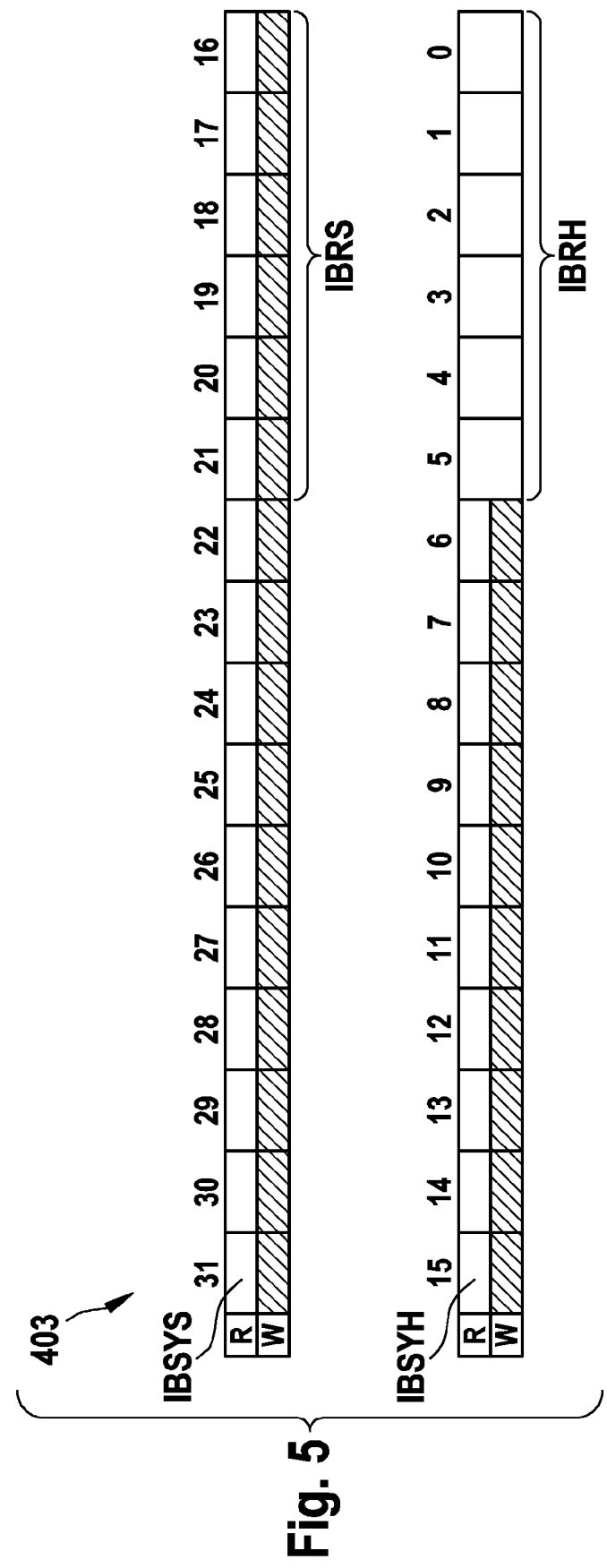
FIG. 5 shows schematically the architecture and the process of the data access in the direction from the user to the message memory, in another aspect.
Figure 6:
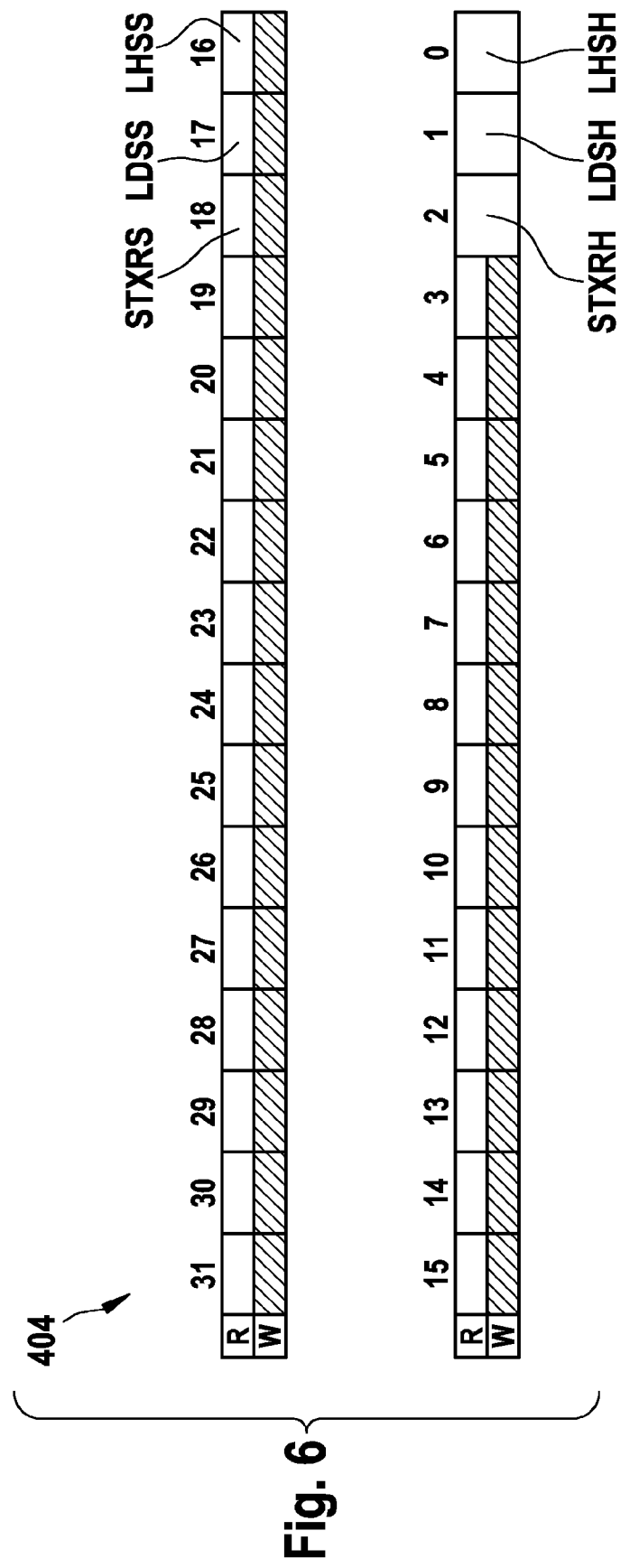
FIG. 6 shows schematically the architecture and the process of the data access in the direction from the user to the message memory, in another aspect.

The write accesses to message memory 300 by host CPU or user CPU 102 via input buffer 201 is first explained in greater detail in FIGS. 4, 5 and 6. For that purpose, FIG. 4 again shows communication module 100, only the parts of communication module 100 relevant here being shown for reasons of clarity. They are, first of all, message handler 200 responsible for controlling the operational sequences, as well as two control registers 403 and 404 which, as shown, may be accommodated outside of message handler 200 in communication module 100, but may also be contained in message handler 200 itself. Reference numeral 403 represents the input buffer command request register, and 404 represents the input buffer command mask register. Thus, write accesses by host CPU 102 to message memory 300 (message RAM) take place via interposed input buffer 201. This input buffer 201 is now designed in a divided or duplicated manner, and specifically as partial buffer 400 and a shadow memory 401 belonging to partial buffer 400. Consequently, as described below, a continuous access of host CPU 102 to the messages or message objects, or rather data of message memory 300 is able to be accomplished, and with that, data integrity and accelerated transmission are ensured. The accesses are controlled via input buffer command request register 403, and via input buffer command mask register 404. In register 403, the numbers from 0 through 31 denote the respective bit positions in register 403, here, by way of example, for a width of 32 bits. The same holds true for register 404, and bit positions 0 through 31 in register 404.

As example, according to the present invention, bit positions 0 through 5, 15, 16 through 21 and 31 of register 403 are now given a special function with respect to the sequence control. Thus, an identifier IBRH (input buffer request host) is able to be entered as message identifier into bit positions 0 through 5 of register 403. In the same way, an identifier IBRS (input buffer request shadow) is able to be entered into bit positions 16 through 21 of register 403. IBSYH is entered into register position 15 of register 403, and IBSYS is entered into register position 31 of register 403 as access identifiers, as well. Positions 0 through 2 of register 404 are also marked, further identifiers being entered as data identifiers in 0 and 1 with LHSH (load header section host) and LDSH (load data section host). These data identifiers are in the simplest form here, namely, each takes the form of one bit. In bit position "2" of register 404, a start identifier is written in with STXRH (set transmission request host).

In the following, the sequence of the write access to message memory 300 via input buffer 201 is now described.

Host CPU 102 writes into input buffer 201, the data of the message to be transferred. In so doing, host CPU 102 is able to write only the configuration and header data KD of a message for header segment HS of message memory 300, or only the actual payload data D of a message that are to be transmitted for data segment DS of message memory 300, or both sets of data KD, D. Which part of a message, thus, configuration data KD and/or actual data D, is to be transmitted is established by special data identifiers LHSH and LDSH in input buffer command mask register 404. In this context, LHSH (load header section host) establishes whether the header data, thus configuration data KD, are to be transmitted, and LDSH (load data section host) establishes whether data D are to be transmitted.

Because input buffer 201 is designed in two parts having a partial buffer 400 and an associated shadow memory 401, and a two-way alternate access is intended to take place, two further data-identifier areas, which are now related to shadow memory 401, are provided as counterpart to LHSH and LDSH. These data identifiers in bit positions 16 and 17 of register 404 are denoted by LHSS (load header section shadow) and LDSS (load data section shadow). They therefore control the transmission process with respect to shadow memory 401.

If the start bit or start identifier STXRH (set transmission request host) is now set in bit position "2" of input buffer command mask register 404, then after configuration data KD and/or actual data D to be transmitted have in each case been transferred into message memory 300, a transmission request is automatically set for the corresponding message object. That is, the automatic sending of a message object to be transmitted is controlled, especially started, by this start identifier STXRH.

Correspondingly, the counterpart to this for shadow memory 401 is start identifier STXRS (set transmission request shadow) which, for example, is contained in bit position "18" of input buffer command mask register 404, and here in the simplest case is likewise in the form of one bit. The function of STXRS is analogous to the function of STXRH, merely specific to shadow memory 401.

When host CPU 102 writes the message identifier, especially the position or number of the message object in message memory 300 into which the data of input buffer 201 are to be transferred, into bit positions 0 through 5 of input buffer command request register 403, thus according to IBRH, partial buffer memory 400 of input buffer 201 and associated shadow memory 401 are exchanged, i.e., the respective access of host CPU 102 and message memory 300 to the two partial memories 400 and 401 is exchanged, as indicated by the semicircular arrows between the two memories 400, 401. In so doing, for example, the data transfer, thus the data transmission to message memory 300 is started, as well. The data transmission to message memory 300 itself is accomplished from shadow memory 401. At the same time, register areas IBRH and IBRS are exchanged. LHSH and LDSH are exchanged for LHSS and LDSS, as well. Likewise, STXRH is exchanged with STXRS.

Therefore, IBRS shows the identifier of the message, thus the number of the message object for which a transmission, thus a transfer from shadow memory 401 is in operation, i.e., which message object, thus which area in the message memory as last has received data (configuration data KD and/or payload data D) from shadow memory 401. By the identifier (here again, for example, 1 bit) IBSYS (input buffer busy shadow) in bit position "31" of input buffer command request register 403, it is indicated whether a transmission with involvement of shadow memory 401 is taking place at the moment. Thus, for example, in the case of IBSYS=1, transmission is taking place from shadow memory 401 at the moment, and in the case of IBSYS=0, is not. For example, this bit IBSYS is set by the writing of IBRH, thus bit positions "0" through "5", in register 403 in order to indicate that a transfer between shadow memory 401 and message memory 300 is in operation. After this data transmission to message memory 300 has ended, IBSYS is reset again.

While the data transfer from shadow memory 401 is just in process, host CPU 102 is able to write the next message to be transferred into input buffer 201 or into partial buffer 400. With the aid of a further access identifier IBSYH (input buffer busy host), e.g., in bit position "15" of register 403, the identifier may be even further refined. If host CPU 102 writes precisely IBRH, thus bit positions "0" through "5" of register 403 while a transmission between shadow memory 401 and message memory 300 is in progress, thus IBSYS=1, then IBSYH is set in input buffer command request register 403. As soon as the current transfer (transmission) is concluded, the requested transfer (request through STXRH, see above) is started, and bit IBSYH is reset. Bit IBSYS remains set during the entire time to indicate that data are being transferred to message memory 300. All bits used in all the exemplary embodiments may also be in the form of identifiers having more than one bit. The 1-bit solution is advantageous for economic reasons from the standpoint of memory and processing. The multi-bit solution would be recommendable for reasons of safety and reliability.

The mechanism thus described allows host CPU 102 to continually transfer data into the message objects located in message memory 300 and made up of header area HB and data area DB, assuming the access speed of host CPU 102 to input buffer 201 is less than or equal to the internal data-transfer rate of communication module 100 (thus of the FlexRay IP module).

Figure 7:
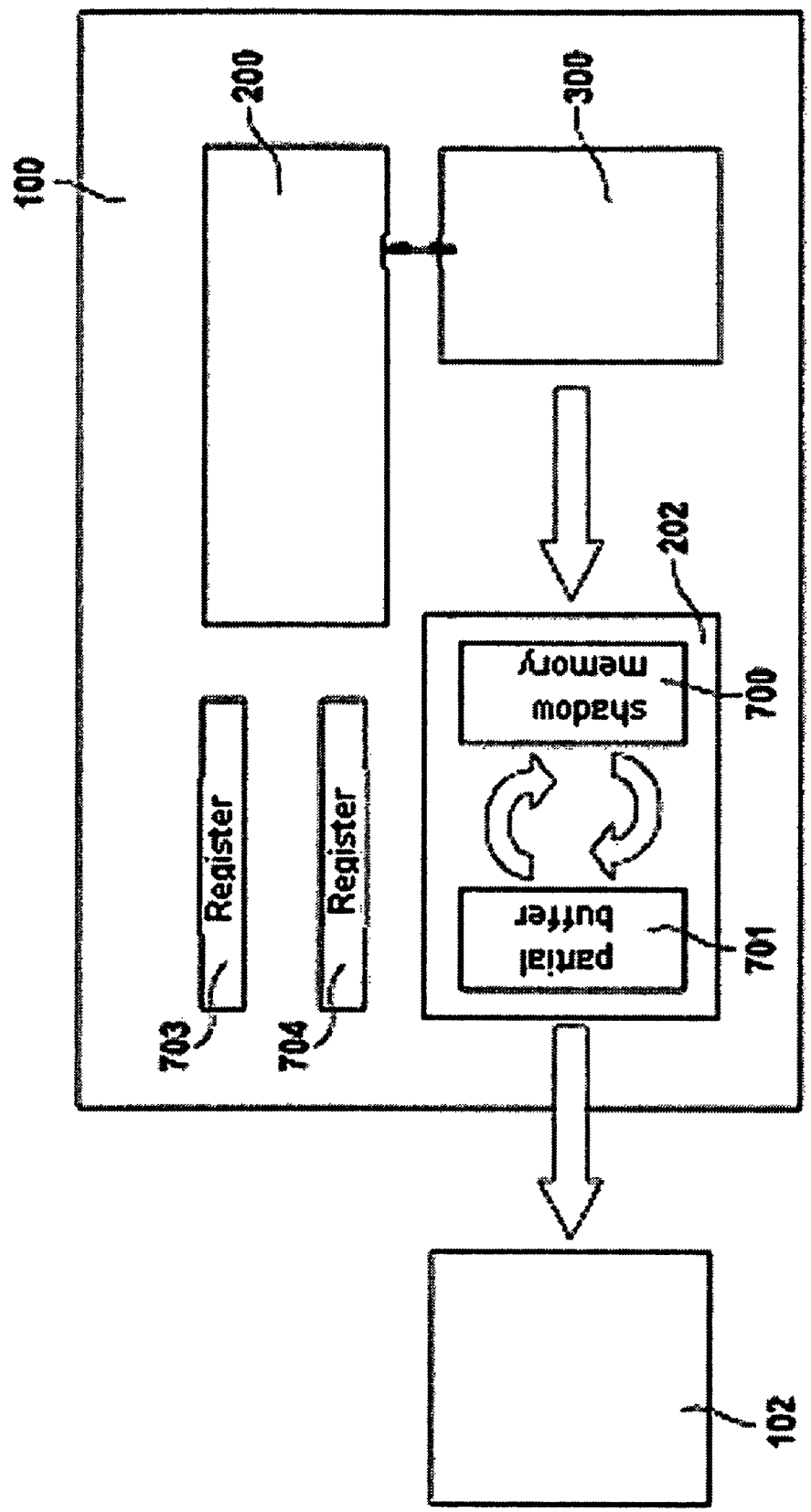
FIG. 7 shows schematically the architecture and the process of the data access in the direction from the message memory to the user, in one aspect.
Figure 8:
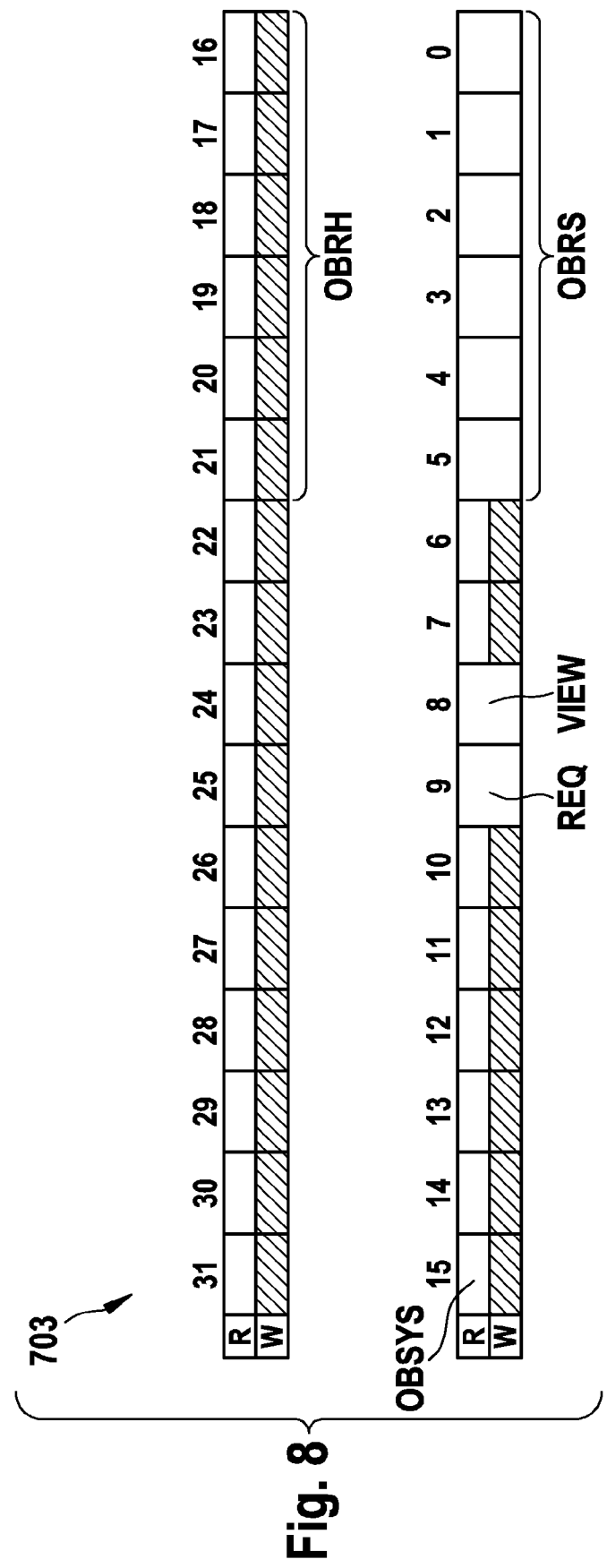
FIG. 8 shows schematically the architecture and the process of the data access in the direction from the message memory to the user, in another aspect.
Figure 9:
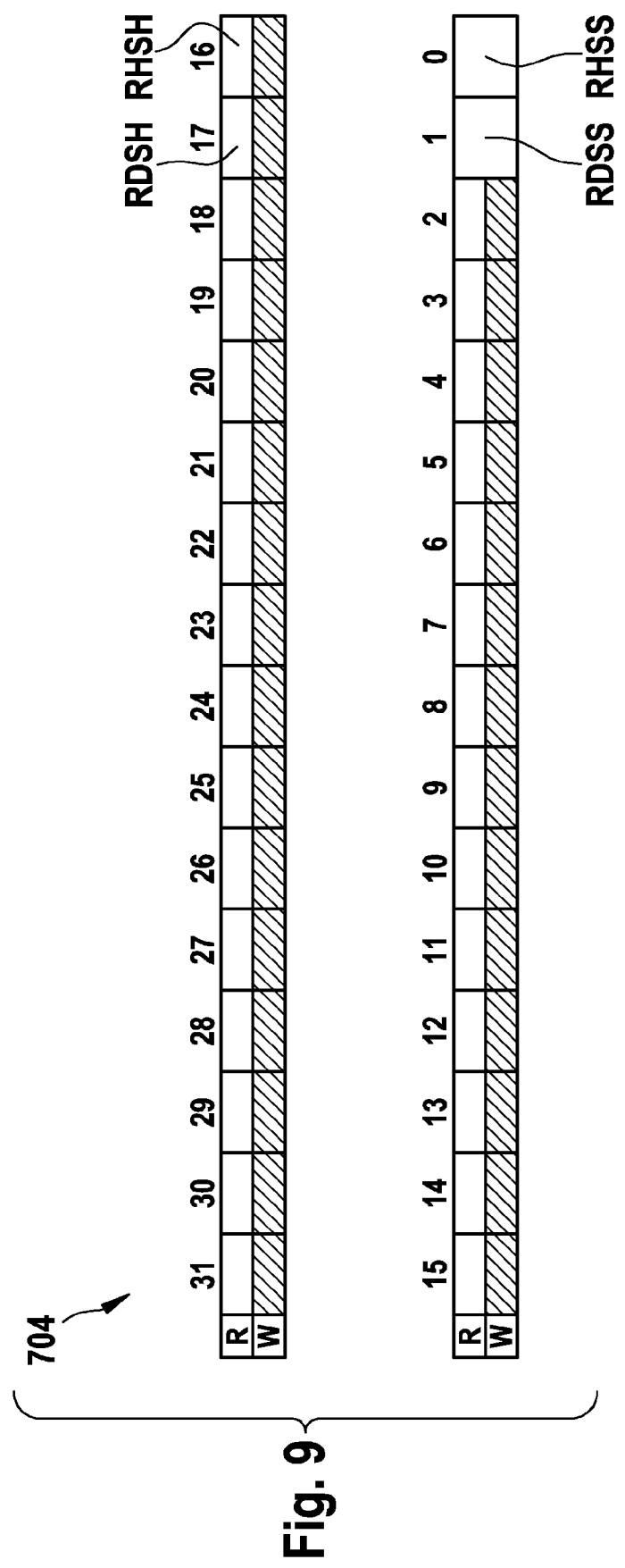
FIG. 9 shows schematically the architecture and the process of the data access in the direction from the message memory to the user, in another aspect.
Figure 10:
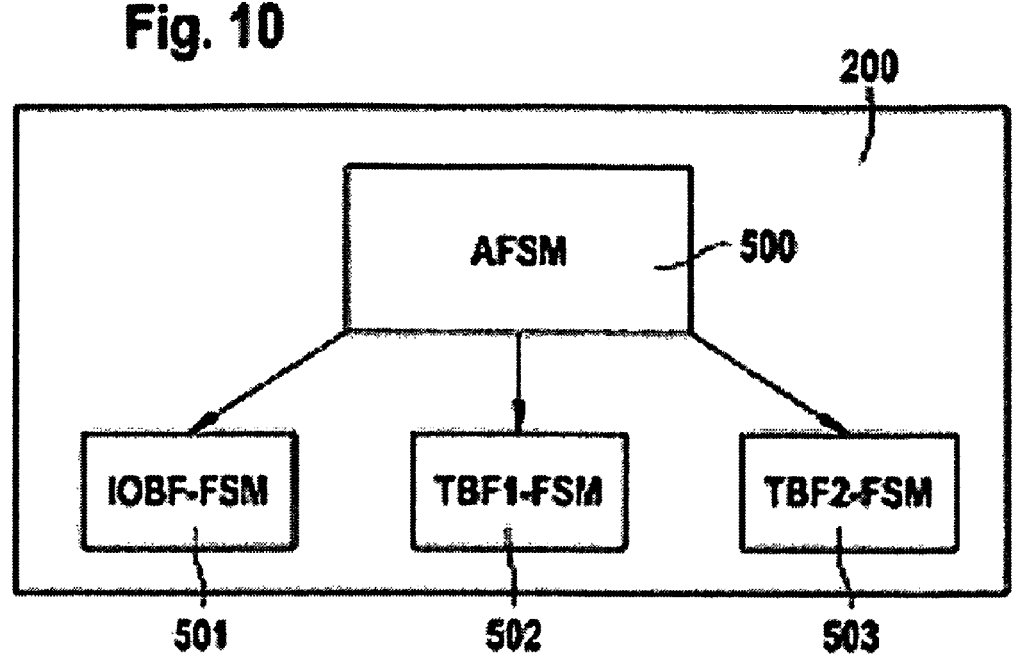
FIG. 10 shows schematically a message handler of the communication module according to FIG. 1 or 2, and finite state machines contained therein.

The read accesses to message memory 300 by host CPU or user CPU 102 via output buffer 202 are now elucidated in FIGS. 7, 8 and 9. For that purpose, FIG. 7 again shows communication module 100, for reasons of clarity, only the relevant parts of communication module 100 being shown here, as well. They are, first of all, message handler 200 responsible for controlling the operational sequences, as well as two control registers 703 and 704 which, as shown, may be accommodated outside of message handler 200 in communication module 100, but may also be contained in message handler 200 itself. Reference numeral 703 represents the output buffer command request register, and reference numeral 704 represents the output buffer command mask register. Thus, read accesses by host CPU 102 to message memory 300 take place via interposed output buffer 202. This output buffer 202 is now likewise designed in a divided or duplicated manner, and specifically as partial buffer 701 and a shadow memory 700 belonging to partial buffer 701. Consequently, as described below, a continuous access by host CPU 102 to the stored messages or message objects, or rather data of message memory 300 is able to be accomplished here, as well, and with that, data integrity and accelerated transmission are now ensured in the reverse direction from message memory 300 to host CPU 102. The accesses are controlled via output buffer command request register 703, and via output buffer command mask register 704. Also in register 703, the numbers from 0 through 31 represent the respective bit positions in 703, here, by way of example, for a width of 32 bits. The same holds true for register 704, and bit positions 0 through 31 in register 704.

By way of example, bit positions "0" through "5", "8" and "9", "15" and "16" through "21" of register 703 are now given a special function with respect to the sequencing control of the read access. Thus, an identifier OBRS (output buffer request shadow) is able to be entered as message identifier into bit positions "0" through "5" of register 703. In the same way, an identifier OBRH (output buffer request host) is able to be entered into bit positions "16" through "21" of register 703. An identifier OBSYS (output buffer busy shadow) is able to be entered as access identifier into bit position "15" of register 703. Positions "0" and "1" of output buffer command mask register 704 are also marked, further identifiers being entered as data identifiers into bit positions "0" and "1" with RDSS (read data section shadow) and RHSS (read header section shadow). Additional data identifiers are provided, for example, in bit positions "16" and "17" with RDSH (read data section host) and RHSH (read header section host). These data identifiers are also in the simplest form here by way of example, namely, each takes the form of one bit. A start identifier REQ is entered into bit position "9" of register 703. A switchover identifier VIEW is also provided, which is entered by way of example into bit position "8" of register 703.

Host CPU 102 requests the data of a message object from message memory 300 by writing the identifier of the desired message, thus, in particular, the position or number of the desired message object, according to OBRS, thus into bit positions 0 through 5 of register 703. As in the reverse direction, in this case the host CPU may also either read only the status or configuration data and header data KD of a message, thus from a header area HB, or may only read payload data D of a message that are actually to be transmitted, thus from data area DB, or also both sets of data KD, D. In this case, which part of the data, thus from header area HB and/or data area DB, is to be transmitted is established in a manner comparable to the reverse direction by RHSS and RDSS. That is to say, RHSS indicates whether header data KD are to be read, and RDSS indicates whether actual data D are to be read.

A start identifier is used to start the transmission from message memory 300 to shadow memory 700. That is, if, as in the simplest case, one bit is used as identifier, the transmission from message memory 300 to shadow memory 700 is started by setting bit REQ in bit position "9" in output buffer command request register 703. The active transmission is again indicated by an access identifier, here again in the simplest case by one bit OBSYS in register 703. To avoid collisions, it is advantageous if bit REQ can only be set when OBSYS is not set, thus no active transmission is taking place at the moment. The message transfer between message memory 300 and shadow memory 700 then also takes place here. The actual operational sequence could now on one hand be controlled in a manner comparable to the reverse direction as described under FIGS. 4, 5 and 6 (complementary register occupancy) and carried out, or else, in a variation, be controlled by an additional identifier, namely, a switchover identifier VIEW in bit position "8" of register 703. That is, after the transmission is completed, bit OBSYS is reset, and partial buffer 701 and associated shadow memory 700 are exchanged, i.e., the accesses to them are exchanged, by setting the bit VIEW in output buffer command request register 703, and host CPU 102 is now able to read out the message object requested from message memory 300, thus the corresponding message, from partial buffer 701. In this context, comparable to the reverse transmission direction in FIGS. 4 through 6, register cells OBRS and OBRH are exchanged here, as well. RHSS and RDSS are likewise exchanged for RHSH and RDSH. As a protective mechanism, it is also possible to provide here that the bit VIEW can only be set when OBSYS is not set, thus no active transmission is taking place.

Therefore, read accesses by host CPU 102 to message memory 300 take place via an interposed output buffer 202. Just like input buffer 201, this output buffer 202 has a duplicate or double design to ensure a continuous access of host CPU 102 to the message objects which are stored in message memory 300. The advantages of high data integrity and accelerated transmission are achieved here, as well.

The use of input and output buffers 201, 202 described ensures that a host CPU 102 is able to access message memory 300 without interruption in spite of the module-internal latency times.

To guarantee this data integrity, the data transmission, especially the forwarding in communication module 100, is undertaken by message handler (MHD) 200. To that end, message handler 200 is shown in detail in FIG. 10. Message handler 200 is displayable in its functionality by a plurality of state machines or state automatons, thus finite automatons referred to as finite state machines (FSM). In this instance, at least three finite state machines are provided, and in one special specific embodiment, four finite state machines are provided. A first finite state machine is the IOBF-FSM (input/output buffer FSM), designated by 501. This finite state machine IOBF-FSM could also be subdivided into two finite state machines per transmission direction with respect to input buffer 201 or output buffer 202, e.g., IBF-FSM (input buffer FSM) and OBF-FSM (output buffer FSM); a maximum of five finite state machines (IBF-FSM, OBF-FSM, TBF1-FSM, TBF2-FSM and AFSM) would thereby be conceivable. However, preferably one joint IOBF-FSM is to be provided.

In accordance with the preferred exemplary embodiment, at least one second finite state machine TBF-FSM is subdivided here into two blocks 502 and 503 and operates the two channels A and B with respect to memories 205 and 206, as described regarding FIG. 2. In this context, one finite state machine may be provided to operate both channels A and B, or else, as in the preferred specific embodiment, one first finite state machine TBF1-FSM (transient buffer 1 (206, RAM A) FSM) designated by 502 may be provided for channel A, and one second finite state machine TBF2-FSM (transient buffer 2 (205, RAM B) FSM) designated by 503 for channel B.

In the preferred exemplary embodiment, an arbiter finite state machine, referred to as AFSM and denoted by 500, is used to control the access of the three finite state machines 501-503. The data (header data KD and/or payload data D) are transmitted in a clock pulse, generated by a clock-pulse arrangement such as a VCO (voltage controlled oscillator), a quartz-crystal oscillator, etc., or adapted or derived from it, in communication module 100. In this context, clock pulse T may be generated in module 100 or predefined from outside, e.g., as bus timing. Arbiter finite state machine AFSM 500 gives access to message memory 300 by turns to one of the three finite state machines 501-503, particularly in each instance for one clock-pulse period T. That is, the time available is distributed in accordance with the access requests by individual finite state machines 501, 502, 503, to these requesting finite state machines 501-503. If only one finite state machine requests access, then it receives 100% of the access time, thus, for the time being, all clock pulses T. If two finite state machines request access, then each finite state machine receives 50% of the access time. Finally, if three finite state machines request access, then each of the finite state machines receives ⅓ of the access time. The bandwidth available in each case is thereby optimally utilized.

First finite state machine 501, thus IOBF-FSM, carries out the following actions as needed:
Data transfer from input buffer 201 to the selected message object in message memory 300.
Data transfer from the selected message object in message memory 300 to output buffer 202.

Finite state machine 502 for channel A, thus TBF1-FSM, carries out the following actions:
Data transfer from the selected message object in message memory 300 to buffer 206 of channel A.
Data transfer from buffer 206 to the selected message object in message memory 300.
Search for the appropriate message object in message memory 300; upon reception, the message object (receive buffer 202) is sought for storage of a message, received on channel A, within the framework of an acceptance filtering, and upon sending, the next message object (transmit buffer 201) to be sent on channel A is sought.

The action of finite state machine TBF2-FSM, thus the finite state machine for channel B in block 503, is analogous thereto. It carries out the data transfer from the selected message object in message memory 300 to buffer 205 of channel B, and the data transfer from buffer 205 to the selected message object in message memory 300. The search function for an appropriate message object in message memory 300 is also analogous to finite state machine TBF1-FSM; upon reception, the message object (receive buffer 202) is sought for storage of a message, received on channel B, within the framework of an acceptance filtering, and upon sending, the next message or message object (transmit buffer 201) to be sent on channel B is sought.

Figure 11:
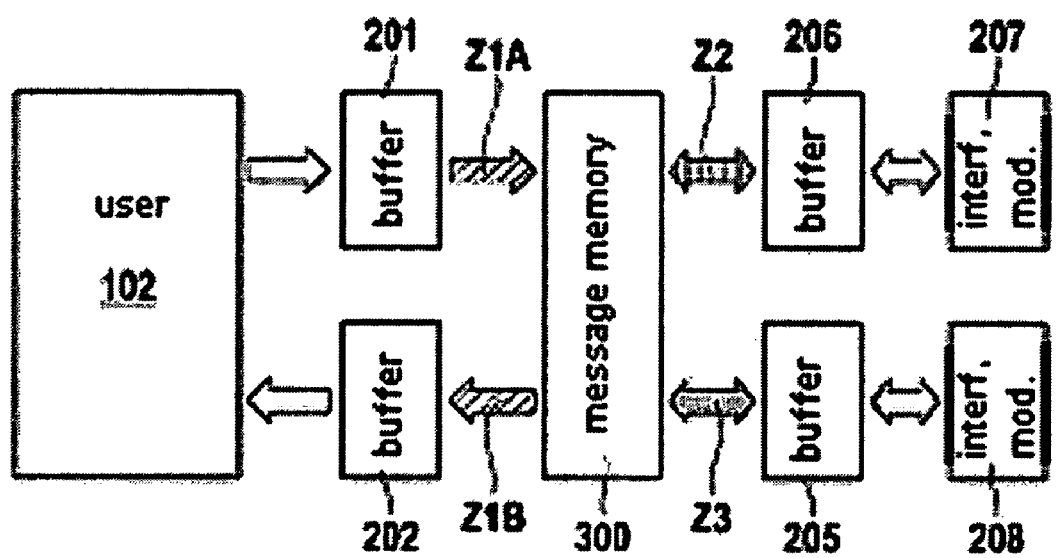
FIG. 11 again shows schematically several component parts of the communication module, as well as the user and the relevant data paths controlled by the message handler.

The operational sequences and the transmission paths are now shown again in FIG. 11. The three finite state machines 501-503 control the respective data transmissions between the individual parts. The host CPU is again denoted by 102, the input buffer by 201, and the output buffer by 202. The message memory is denoted by 300, and the two buffers for channel A and channel B are denoted by 206 and 205. Interface elements 207 and 208 are likewise shown. First finite state machine IOBF-FSM 501 controls data transfer Z1A and Z1B, thus from input buffer 201 to message memory 300 and from message memory 300 to output buffer 202. The data are transmitted via data buses with a word length of, e.g., 32 bits, any other bit number also being possible. The same holds true for transmission Z2 between message memory 300 and buffer 206. This data transmission is controlled by finite state machine TBF1-FSM 502, the finite state machine for channel A. Transmission Z3 between message memory 300 and buffer 205 is controlled by finite state machine TBF2-FSM 503. Here, as well, the data is transferred via data buses with a word length of, e.g., 32 bits, any other bit number likewise being possible here. Normally, the transfer of a complete message object via the indicated transmission paths requires a plurality of clock-pulse periods T. Therefore, the transmission time is divided specific to clock-pulse periods T by the arbiter, i.e., AFSM 500. Thus, FIG. 11 shows the data paths between the memory components controlled by message handler 200. To ensure the data integrity of the message objects stored in message memory 300, advantageously, data should be exchanged on only one of the paths shown, thus Z1A and Z1B as well as Z2 and Z3, at the same time.

Figure 12:
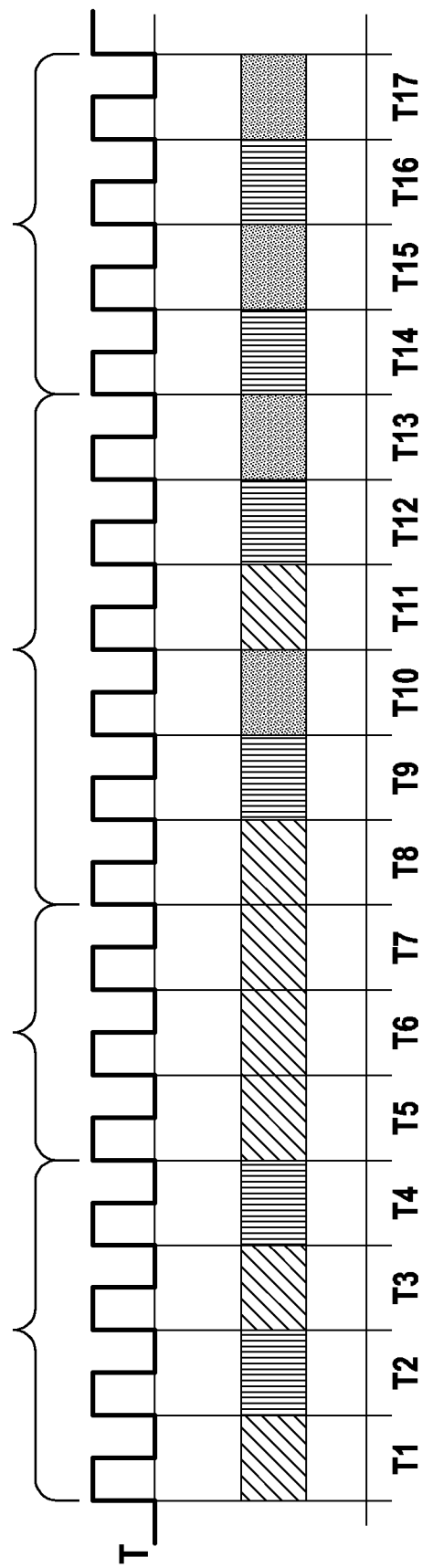
FIG. 12 shows the access distribution specific to the data paths from FIG. 11.

FIG. 12 shows, by way of example, how the available system clock pulses T are distributed by the arbiter, thus AFSM 500, to the three requesting finite state machines 501-503. In phase 1, access requests are made by finite state machine 501 and finite state machine 502, i.e., the total computing time is distributed one half each to the two requesting finite state machines 501, 502. Specific to the clock-pulse periods in phase 1, this means that finite state machine 501 receives access in clock-pulse periods T1 and T3, and finite state machine 502 receives access in clock-pulse periods T2 and T4. In phase 2, access is made only by finite state machine 501, so that all three clock-pulse periods T5 through T7, thus 100% of the access time, is allotted to finite state machine IOBF-FSM 501. In phase 3, access requests are made by all three finite state machines 501-503, so that the total access time is divided three ways. For example, arbiter AFSM 500 then distributes the access time so that finite state machine 501 receives access in clock-pulse periods T8 and T11, finite state machine 502 receives access in clock-pulse periods T9 and T12, and finite state machine 503 receives access in clock-pulse periods T10 and T13. Finally, in phase 4, access is made by two finite state machines 502 and 503 on the two channels A and B of communication module 100, so that an access distribution of clock-pulse periods T14 and T16 to second finite state machine 502 is implemented, and in T15 and T17 to third finite state machine 503.

Thus, arbiter finite state machine AFSM 500 ensures that, for the case when more than one of the three finite state machines 501-503 makes a request for access to message memory 300, the access is distributed with clock-pulse timing and in alternation to the requesting finite state machines. This procedure ensures the integrity of the message objects stored in message memory 300, thus the data integrity. For example, if host CPU 102 wants to read out a message object via output buffer 202 while at the moment a received message is being written into this message object, then depending upon which request was started first, either the old state or the new state is read out, without the accesses in the message object in message memory 300 itself colliding.

The method described permits host CPU 102, during continuous operation, to read or to write any message object in message memory 300 without the selected message object being blocked from participation in the data exchange on both channels A and B of FlexRay bus 101 for the duration of the access by host CPU 102 (buffer locking). At the same time, by the interleaving of the accesses with clock-pulse timing, the integrity of the data stored in message memory 300 is ensured, and the transmission rate is also increased by utilization of the full bandwidth.

Message memory 300 of a communication module 100 stores the message objects provided for the communication. During the communication, the following tasks arise:

Upon reception of a message via communication link 101, the matching message object must be found in message memory 300, so that the received message can be stored at the corresponding position of the message object in message memory 300. A received message is only stored in message memory 300 if an identification field of the received message agrees with that of a configured message object (the so-called receive object). The identification field of the configured receive-message object is ascertained by searching through entire message memory 300 for a message object that is provided for reception via the channel (A or B) considered, that is provided for reception in the communication cycle considered, that is provided for reception in the time slots considered, and that is provided for reception.

In the same way, punctually at the beginning of a send window, the message object (send object) matching this send window must be found in message memory 300 and made available for sending. A message object pending for sending is only sent if the identification field of the message to be sent agrees with that of a configured message object (the so-called send object). The identification field of the configured send-message object is ascertained by searching through entire message memory 300 for a message object that is provided for sending via the channel (A or B) considered, that is provided for sending in the communication cycle considered, that is provided for sending in the time slots considered, and that is provided for sending.

In both cases, the matching message object in the message memory must be ascertained promptly in order to ensure the real-time capability of the communication module. Since it is not known at what position in message memory 300 the message object for the next time window is located, message memory 300 must be searched completely once per time window. This consumes a great deal of time, particularly in the case of larger message memories 300, and can jeopardize or impair the real-time capability of the communication system.

The present invention describes a new and improved method for searching the message memory, in which the identification fields of the stored message objects in message memory 300 are searched in advance for, in each instance, a plurality of time windows (or time slots) by a single search run through message memory 300 for the plurality of time windows contemplated. Thus, a search run of entire message memory 300 is always carried out for a plurality of considered, future time windows in a specifiable raster, the spacing of the instants for carrying out the search run in the raster being greater than one time window and including a plurality of time windows.

In particular, it is provided that in a search run for a plurality of future time slots considered, the following search criteria are checked:[1]

[1] Translator's note: The German here is a bit muddled, but I believe this was the intention.

Ascertaining whether message objects for transmission channel CH A, CH B contemplated are stored in message memory 300;

Ascertaining whether message objects for the communication cycle contemplated are stored in message memory 300;

Ascertaining whether message objects for the plurality of contemplated time windows still following are stored in message memory 300; and Checking whether the ascertained message objects are objects to be sent or to be received.

Figure 13:
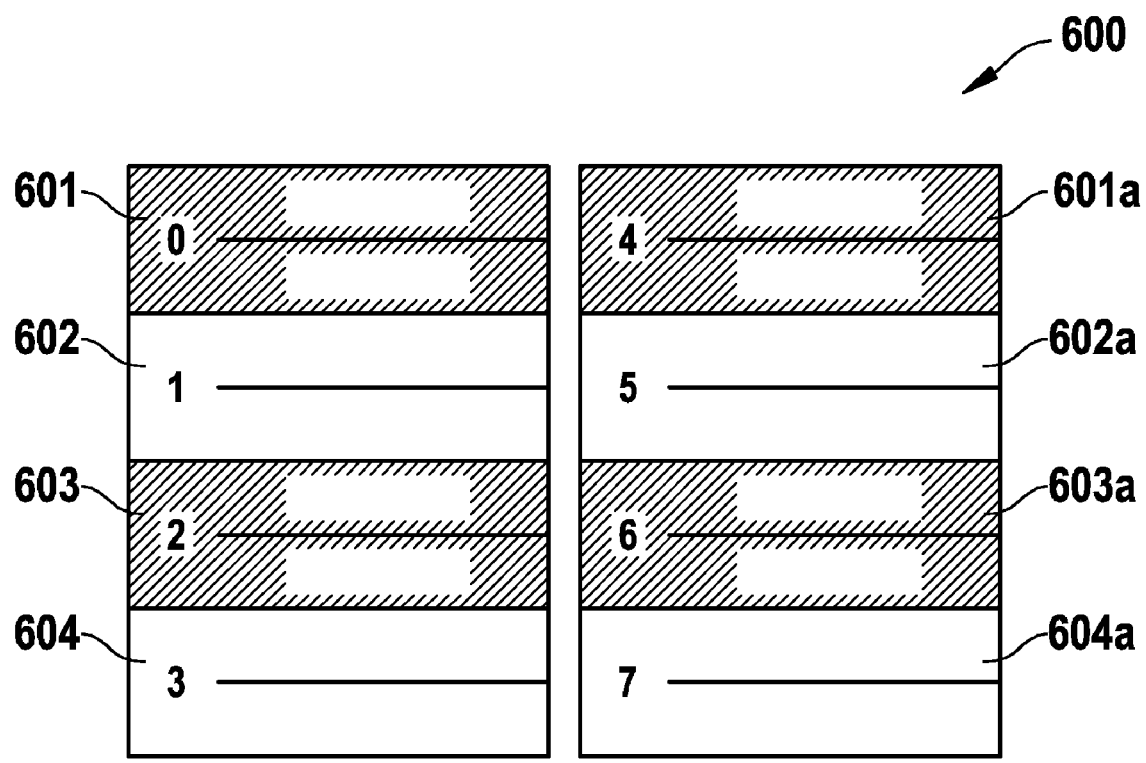
FIG. 13 shows a buffer of a communication module according to the present invention.

If one or more message objects are ascertained in message memory 300 which satisfy one or more, preferably all the above requirements, the positions of the objects found in the message memory are stored in a buffer assigned to message memory 300, which is shown in FIG. 13 and is denoted in its entirety by reference numeral 600. Buffer 600 is designed to be at least large enough that it includes at least one data field for each of the time slots considered in advance. In the exemplary embodiment shown, message memory 300 is searched in a raster of four time windows, i.e., merely all 4 time windows. However, the search is carried out not only for a single, current time window, but rather simultaneously or quasi-simultaneously for a plurality of future time windows. Therefore, buffer 600 has four data fields 601 through 604, in order to be able to store the positions of the maximally four ascertained message objects. In each case, two data words, namely, one pointer i and one status i, may be stored in each of the data fields 601 through 604, i corresponding to a unique number (or identifier) of data field 601-604 in message memory 300. Data field 601 is preferably assigned to the first future time window considered, data field 602 to the second and so forth up to data field 604, which is assigned to the last future time window considered. Thus, if a corresponding message object is ascertained in message memory 300 for the first future time window considered, pointer i and status i of the message object ascertained for first time window i are stored in the two data words of data field 601.

In each case the position, e.g., the number, of the referenced message object in message memory 300 is stored as data word pointer 0 . . . 3 in data fields 601-604. Thus, the data word pointer 0 . . . 3 is a type of pointer element (so-called data pointer) that points to the beginning of the message object in message memory 300, preferably to the beginning of header area HB in header segment HS, that is, to configuration data KD of the ascertained message object. As status 0 . . . 3 of the message stored in message memory 300, preferably information as to whether a message is to be received or to be sent at all for the time window contemplated and/or whether the message is to be sent or to be received is stored in buffer 600. If the message is to be sent, status 0 . . . 3 is set to 'tx_buf', and if the message is to be received, status 0 . . . 3 is set to 'rx_buf'. If the message for the time slot considered is neither to be sent nor to be received, the status is set to 'empty', provided this was not already carried out at the beginning of the search run for all data words of data fields 601-604, but at least for the data words status 0 . . . 3.

FIG. 13 shows clearly that buffer 600 shown has a dual design, that is, data fields 601-604 are duplicated, so that additional data fields 601a-604a are present. This has the advantage that, for example, data fields 601-604 may be accessed within the course of a search run, while at the same time data fields 601a-604a may be accessed within the course of the actual data transmission, thus the sending or receiving of data. When the data transmission and the search run are ended, the data fields are exchanged, so that data fields 601a-604a may be accessed within the course of a search run, while at the same time data fields 601-604 are accessed within the course of the actual data transmission, thus the sending or receiving of data. In this way, it is possible to avoid delays in the data transmission because of the search run through message memory 300.

A send filtering is usefully carried out, that is, message memory 300 is searched for the position (i.e., the message object) which is provided for the buffering of a message that is intended to be sent by host CPU 102 in the communication cycle considered and in the time window considered via the channel considered by way of communication link 101. Additionally or alternatively, a receive filtering is carried out, that is, message memory 300 is searched for the position (i.e., the message object) which is provided for the buffering of a message that is intended to be received by host CPU 102 in the communication cycle considered and in the time window considered via the channel considered of communication link 101. The aim of the search method is to reduce the number of search runs through message memory 300 necessary per communication cycle, and thereby to improve the real-time capability of communication module 100.

The description relates to a buffer 600 having a total of 8 elements 601-604 and 601a-604a. However, the size of buffer 600 may be varied as desired, particularly enlarged, while retaining the method of the present invention for transmitting data, especially the proposed search method, and therefore may be adapted flexibly to the size of message memory 300. In addition, based on the size of buffer 600, it is possible to establish in advance, for how many time windows at maximum message memory 300 is supposed to be searched in advance within the framework of a search run. To be able to ensure proper functioning of the method according to the present invention, especially to avoid leaving out messages to be sent or to be received, if possible, between the end of the search run for specific time slots and the end of the actual data transmission for these time slots, no reconfiguration of message memory 300 should be carried out. Namely, such a reconfiguration would possibly allow the contents of buffer 600, ascertained in the last search run, to become invalid, because due to the reconfiguration, the allocation of the storage areas of message memory 300 to the messages, to be sent or to be received, of the time slots in question could possibly have changed. In such a case, a new search run would be necessary, which at the least could lead to a delay in the data transmission, possibly even to a small loss of data. However, the FlexRay specification includes suitable mechanisms to be able to catch such a delay or such a data loss, so that there is no need to fear any negative effects on the data transmission.

Figure 14:
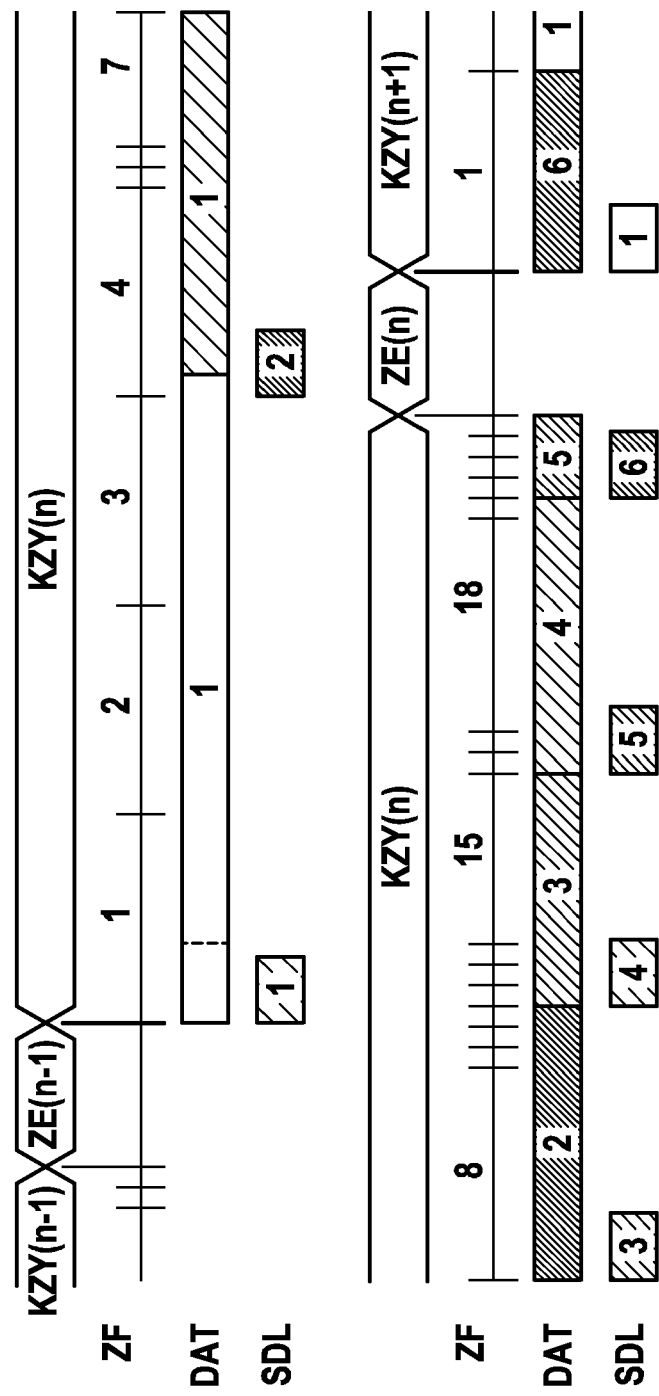
FIG. 14 shows a flow chart of the search method for execution within the framework of the data-transmission method according to the present invention.

The method of the present invention is explained in detail below with reference to FIG. 14. In FIG. 14, the communication cycle is denoted by KZY. The cycle end is denoted by ZE and the time windows are denoted by ZF. The search run is denoted by SDL. Finally, the actual data transmission, that is, the sending of messages or the receiving of messages, is denoted by DAT. In FIG. 14, a communication cycle KZY(n) is considered. It first of all includes four time windows "1" through "4" of a static segment of cycle KZY(n), followed by a total of 20 time windows of a dynamic segment of cycle KZY(n). Included at cycle end ZE(n) are, for example, a symbol window (if present) and the so-called network idle time (NIT), which is used to synchronize the local clocks of users 102. In the exemplary embodiment shown, the message memory is always searched for four time slots ZF in advance. Only the first search run after the start of the method of the present invention forms an exception, since initially all 8 elements 601-604 and 601a-604a of buffer 600 must be filled.

Figure 15:
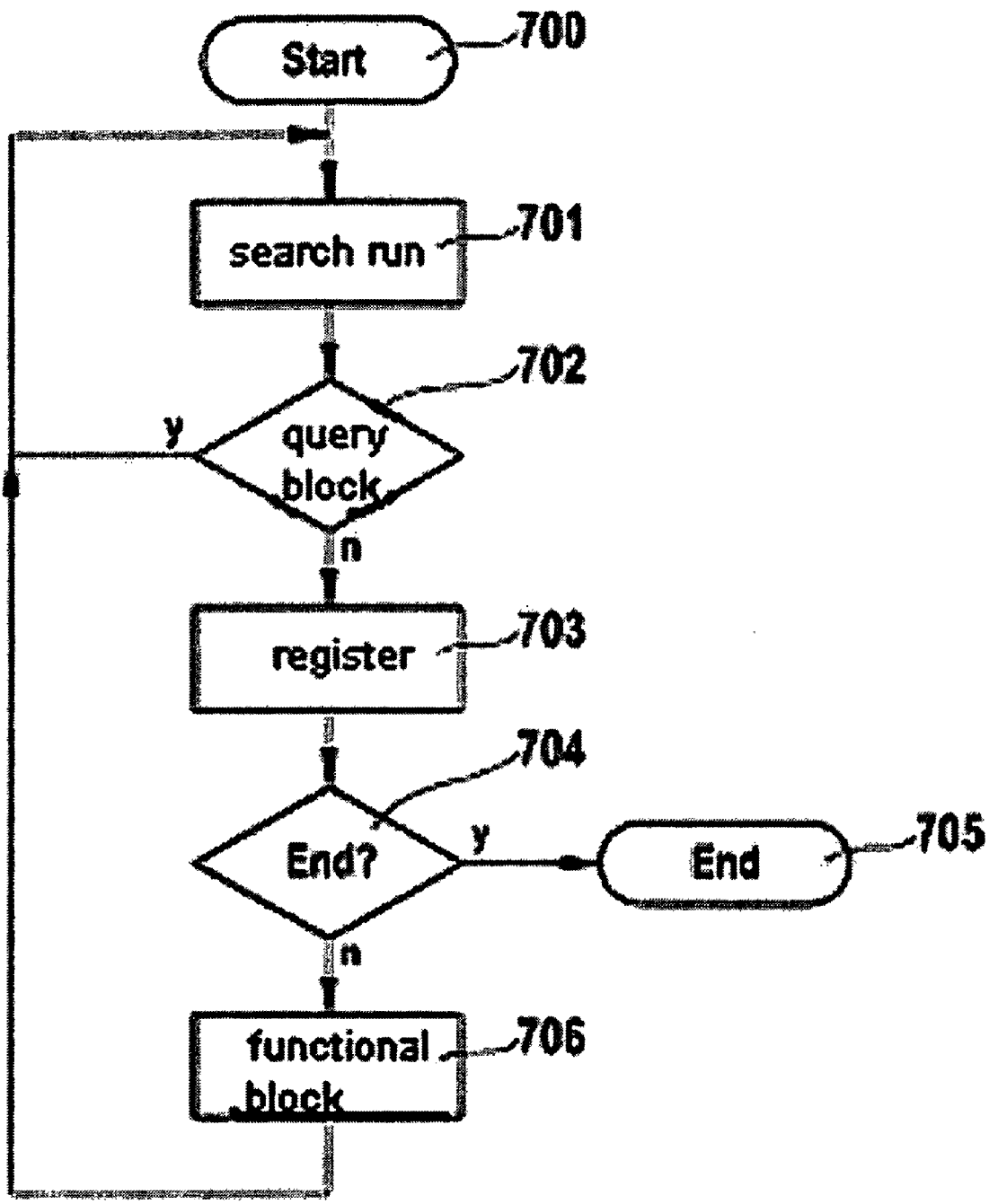
FIG. 15 shows a flow chart of the data-transmission method of the present invention according to one specific embodiment.

A flow chart of the method according to the present invention is illustrated in FIG. 15. The method begins in a functional block 700. A first search run, which is explained in greater detail below, is carried out in a functional block 701. For example, in the course of the search run, the relevant information needed for the subsequent actual data transmission is stored in fields or elements 601-604 of buffer 600. If it is the first search run after the start of the method according to the present invention, the remaining fields or elements 601a-604a of buffer 600 are still empty and must be filled by a further search run directly following. Therefore in a query block 702, it is checked whether or not it is the first search run since the start of the method. If yes, search run 701 is run through again, otherwise the method branches to a functional block 703 where the actual data transmission, that is, the sending and/or receiving of messages, is carried out for that user 102 for which communication module 100, i.e. its message memory 300, was searched in the preceding search run. Subsequently, in a query block 704, it is checked whether the method of the present invention has ended. If yes, there is a branching to a block 705, and the method is ended. Otherwise, the method branches to a functional block 706, where fields or elements 601-604 of buffer 600 are exchanged with fields or elements 601a-604a, so that the information ascertained in a subsequent search run 701, especially the positions of the message objects, is no longer stored in fields 601-604, but rather now in fields 601a-604a. Likewise, as a result of the exchange of the fields of buffer 600 in functional block 706, during the following actual data transmission, fields 601a-604a are no longer accessed, but rather now fields 601-604. In addition, in functional block 706, the next four times slots are determined as the time slots to be considered in the following search run. The method then branches again to functional block 701, and a search run and an actual data transmission are carried out once more, this time, however, in each case for the next four times slots than in the preceding run-through.

The search run, denoted generally in FIG. 15 by reference numeral 701, is explained in greater detail in light of the exemplary embodiment from FIG. 14. The search run is implemented for four successive time windows ZF, a matching message object being sought in message memory 300 for all four time windows. Since, according to specification, first time window "0" does not exist, as an exception, the first search run includes only three time windows ZF. However, all subsequent search runs include four time windows ZF. To ascertain a matching object, in particular, the criteria already mentioned above—communication cycle, time slot, channel and sending/receiving—are checked. The search result in the form of the position of the ascertained matching message objects in message memory 300 is stored in buffer 600. The buffer is made up of a list having 8 elements 601-604 and 601a-604a, element "0" through element "7".

After the conclusion of the configuration phase of communication module 100 and at the end of each communication cycle KZY(n−1), buffer 600 is erased. All pointers "0" through "7" are set to 0, and all status information fields "0" through "7" are set to 'empty'. As an exception, the first search run proceeds somewhat differently from the other search runs. In the last search run of preceding cycle KZY(n−1), message memory 300 is searched for matching message objects for first time slot ZF of subsequent communication cycle KZY(n). If there is no preceding communication cycle KZY(n−1) because, for example, the system was just now started up and configured, message memory 300 is searched for matching message objects for first time slot ZF of following communication cycle KZY(n) subsequent to the configuration phase. The result of this search is stored in the buffer in element "1" 602.

Communication cycle KZY(n) subsequently begins, and in first time slot ZF1, a reduced search run is carried out, during which message memory 300 is searched for matching message objects for time slots ZF2 and ZF3. The results of the reduced search run are stored in elements "2" 603 and "3" 604 of buffer 600. Moreover, in first time slot ZF1, message memory 300 must also be searched for matching message objects for the following four time slots ZF4 through ZF7. The results of this search are stored in elements "4" 601*a* through "7" 604*a* of buffer 600. The search for matching objects for time slots ZF2 through ZF7 may be performed during a single search run SDL1. Furthermore, the actual data transmission of the message provided for first time slot ZF1 is carried out in first time slot ZF1. First time slot ZF1 according to the FlexRay specification with certainty is a static time slot, which—unlike dynamic time slots—does not fall below a specific minimum duration that is sufficiently long to carry out all steps indicated above during first time slot ZF1.[2] Since buffer 600 is empty at the moment of first search run SDL1, information must only be stored in buffer 600 if message objects which are actually matching were found in message memory 300. If no objects were found for a specific time slot ZF, the corresponding element 601-604 or 601*a*-604*a* remains on pointer='0' and status='empty'.

[2]Translator's note: See footnote 1.

During first search run SDL1, in first time window ZF1, the identification field of the first message object is initially read out from header section HS of message memory 300. The identification field of a message includes at least the following status bits: 11 bit frame ID (bits 0 through 10 of the header word), 7 bit cycle code (bits 16 through 22 of the header word), 1 bit channel A (CH A) (bit 24 of the header word), 1 bit channel B (CH B) (bit 25 of the header word) and one bit transmission mode (TXM) (bit 28 of the header word). If this identification field matches one of the time windows ZF2 through ZF7 of communication cycle KZY(n) considered, then the pointer of corresponding element "2" through "7" of buffer 600 is set to the number of the message object in message memory 300, and the corresponding status "2" through "7" is set to 'tx_buf' or 'rx_buf', depending upon whether the message is to be sent or received.

Then—still within the course of the same search run SDL1—the identification field of the next message object is read out, it is checked whether an agreement exists for time windows ZF2 through ZF7, and, if need be, the pointer and the status information field of corresponding element 601-604, 601*a*-604*a* of buffer 600 are set.

Should the status of the corresponding buffer element already no longer be on 'empty', then no pointer and no status information are stored in buffer 600. Thus, if two or more message objects are configured for the same time window ZF in the same communication cycle KZY(n), then the first is used and the following are discarded.

With the read-out of the last identification field from the header section of message memory 300, search run SDL1 is completed. Now, within the course of the actual data transmission, the number of the matching message object can be taken directly from buffer 600 for time windows ZF1 through ZF7 without a great time delay.

With the beginning of time window ZF4, elements 602 through 604 of buffer 600 are already processed (the element 601 was not needed, since one time window ZF0 is missing), that is, the actual data transmission was already carried out during these time windows ZF1 through ZF3. Elements 601 through 604 of buffer 600 can now be erased (pointer='0', status='empty'), and the next search run SDL2 is started. This search run relates to time windows ZF8 through ZF11 of the current communication cycle KZY(n). The search results are stored in elements "0" 601 through "3" 604 of buffer 600. With the beginning of time window ZF8, a further search run SDL3 is started for time windows ZF12 through ZF15. The search results are stored in buffer elements "4" 601*a* through "7" 604*a*, which likewise were erased at the beginning of the new search run SDL3 (pointer='0', status='empty').

The execution of the actual data transmission DAT after reaching the respective time window ZF is carried out concurrently (in parallel) with the search runs SDL. So, for example, during second search run SDL2, the actual data transmission for time windows ZF4 through ZF7 is executed, the information as to where the messages to be transmitted (to be sent or to be received) are to be stored in message memory 300 or are to be read out from message memory 300 being taken from elements "4" 601*a* through "7" 604*a* of buffer 600, where they were stored during first search run SDL1. In the same way, during third search run SDL3, the actual data transmission for time windows ZF8 through ZF11 is executed, the information as to where the messages to be transmitted are to be stored in message memory 300 or are to be read out from message memory 300 being taken from elements "0" 601 through "3" 604 of buffer 600, where they were stored during second search run SDL2. The further search runs SDL4 through SDL6 proceed in a corresponding manner; during last search run SDL6 of current communication cycle KZY(n), message memory 300—as already explained above—is searched for matching message objects for first time slot ZF1 of the following communication cycle KZY(n+1).

Each search run SDL may be interrupted by other operational sequences, but must be concluded after four time windows ZF at the latest. Should this requirement not be attainable, buffer 600 may also be enlarged, for example, from 8 to 16 elements. The available time is thereby increased to 8 time windows, for instance. However, the flexibility in the data transmission system is thereby restricted, since for the, at this point, 8 time windows which were searched in advance, no reconfiguration should occur until the actual data transmission has been executed for these time windows.

If, at the beginning of the assigned time window ZF, the transfer from message memory 300 into the transmitting unit is begun for a send object, then it is checked that the message object was not changed in the meantime. If this has happened, then the entry in buffer 600 is discarded, and the corresponding message object is not sent. If, at the end of the assigned time window ZF (beginning of the next time window), the transfer from the reception unit is begun for a receive object, it is checked that the message object was not changed in the meantime. If this has happened, then the entry in buffer 600 is discarded, and the received message is not stored. The data integrity may be checked, for instance, using a check-sum operation or in any other way (e.g., parity bit or CRC).

For the knowledgeable person skilled in the art, a multitude of possibilities for expanding the present invention are apparent which can be realized without departing from the concept of the present invention. In the following, only a few possible expansion possibilities are listed by way of example.

If, during the operation of the data transmission system, a message object is reconfigured in message memory 300, then it is checked whether the identification field matches the current time-window range ZFi through ZFi+3 of buffer 600. If yes, the corresponding buffer element 601-604 and 601a-604a is implemented, as needed. Due to this expansion, it is possible to reconfigure a message object up to the beginning of the time window ZF stipulated in the identification field, regardless of the size of buffer 600.

Using the method described, message memory 300 of a communication module 100 is searched in foresighted manner for the message objects appropriate for the next time windows ZF. The message objects provided for the next time windows ZF can be accessed quickly via the pointers, stored in buffer 600, that point to the message objects and their status. Therefore, a separate search run through the entire message memory 300 is no longer necessary per time window ZF.

The use of the search method described reduces the number of search runs through message memory 300 necessary per communication cycle KZY(n). In this manner, the real-time capability of communication module 100 can be decidedly improved.

What is claimed is:

1. A method for transmitting data in messages which are transmitted cyclically in specifiable time windows via a communication link of a communication system, the method comprising:
    initially storing, temporarily, messages sent and to be sent via the communication link, in a message memory of a communication module, the message to be sent or to be received in a current time window being taken from the message memory and sent, or received, and stored in the message memory;
    searching, to determine positions of the messages in the message memory, in advance at regular intervals, each interval being greater than one time window, for, in each instance, a plurality of time windows still following; and
    storing, as a result of a search run, the positions of the messages to be sent or to be received in the plurality of time windows still following in a buffer assigned to the message memory.

2. The method of claim 1, wherein within the course of the data transmission, one of the following is satisfied:
    the message to be transmitted in the current time window via the communication system is read out from the position in the message memory indicated in a buffer for this time window and transmitted via the communication link, and
    the message transmitted in the current time window via the communication link is stored at the position in the message memory indicated in the buffer for this time window.

3. The method of claim 1, wherein the data transmission for the current time window and the following plurality of time windows for which the positions of the messages in the message memory were already stored in the buffer, after reaching the respective time windows, is carried out simultaneously with the search run for the time window following the last time window of the data transmission, and the subsequent plurality of time windows.

4. The method of claim 1, wherein the number of the plurality of time windows of the search run is the same as the number of the plurality of time windows for the data transmission.

5. The method of claim 1, wherein the messages to be stored in the message memory include first data having a first scope of data and second data having a second scope of data, and the first data are stored in a header segment of the message memory in one header area each per message, and the second data are stored in a data segment in one data area each per message.

6. The method of claim 5, wherein stored in the header area of the message memory per message is an identifier which identifies the respective message, and by which the message is assignable to one specific communication cycle, one specific time window within the cycle and one or two channels.

7. The method of claim 1, wherein two fields are provided in the buffer for each of the messages considered during a search run and to be sent or received in one of the plurality of time windows still following, a pointer to the corresponding position of the message stored in the message memory being stored in a first field, and a status of the message stored in the message memory being stored in a second field.

8. The method of claim 5, wherein the pointer points to first data of the message stored in the message memory, the first data being stored in a header area in the header segment.

9. The method of claim 7, wherein stored in the buffer as status of the message stored in the message memory is information as to at least one of whether a message is to be received or to be sent for the time window considered and whether the message is to be sent or to be received.

10. The method of claim 3, wherein the buffer is subdivided, the positions of the messages for the current time window and the subsequent plurality of time windows for which positions in the message memory were already stored in the buffer being stored in a first part of the buffer for the data transmission, and the positions of the messages for the time window following the last time window of the data transmission and for the subsequent plurality of time windows being stored in a second part of the buffer for a search run.

11. The method of claim 1, wherein to determine the positions of the messages in the message memory, it is searched in advance at regular intervals for, in each instance, four time windows still following, and the positions of the messages to be sent or to be received in the four time windows still following are stored in the buffer as a result of a search run.

12. The method of claim 1, wherein in the course of a search run, the message memory is searched for the plurality of time windows still following according to at least one of the following:
    determining whether messages for a transmission channel considered are stored in the message memory;
    determining whether messages for a communication cycle considered are stored in the message memory;
    determining whether messages for the plurality of time windows still following are stored in the message memory; and
    determining whether the determined messages are messages to be sent or messages to be received.

13. A communication module disposed in a communication system between a communication link and a user, the communication system being arranged for a cyclical transmission of messages in specifiable time windows, the communication module comprising:

a message memory for temporarily storing messages which are to be transmitted or were received for the user via the communication link;

a searching arrangement, to determine the positions of the messages in the message memory, for searching the message memory in advance at regular intervals, each interval being greater than one time window, for, in each instance, a plurality of time windows still following, a buffer assigned to the message memory; and a storing arrangement for storing the positions of the messages to be sent or to be received in the plurality of time windows still following, in the buffer as the result of a search run.

14. The communication module of claim 13, wherein the arrangement for searching the message memory and the arrangement for storing the positions of the determined messages in the buffer are in the form of a finite state machine.

15. The communication module of claim 13, wherein the communication module is arranged as a FlexRay communication module for receiving, sending and buffering messages transmitted according to a FlexRay specification.

16. The communication module of claim 13, wherein within the course of the data transmission, one of the following is satisfied:

the message to be transmitted in the current time window via the communication system is read out from the position in the message memory indicated in a buffer for this time window and transmitted via the communication link, and the message transmitted in the current time window via the communication link is stored at the position in the message memory indicated in the buffer for this time window.

17. A communication system, comprising:
a host processor;
at least one further host processor;
a communication link to which the host processors are connected; and
a communication module being disposed between the communication link and the host processor, the communication system being arranged for cyclically transmitting messages in specifiable time windows, and the communication module including:
a message memory for temporarily storing messages which are to be transmitted from or were received for the host processor via the communication link via the communication link, wherein to determine positions of the messages in the message memory, and a searching arrangement for searching the message memory in advance at regular intervals, each interval being greater than one time window, for, in each instance, a plurality of time windows still following, a buffer assigned to the message memory, and a storing arrangement for storing the positions of the messages to be sent or to be received in the plurality of time windows still following, in the buffer as a result of a search run.

18. The host processor of claim 17, wherein the host processor is integrated together with the communication module on a shared semiconductor component.

19. The host processor of claim 17, wherein the arrangement for searching the message memory and the arrangement for storing the positions of the determined messages in the buffer are in the form of a finite state machine.

20. A communication system comprising:
a plurality of users coupled via a communication link;
a communication module being disposed between the communication link and at least one of the users, wherein the communication system is arranged for cyclically transmitting messages in specifiable time windows, and wherein the communication module includes:
a message memory for temporarily storing messages which are to be transmitted from or were received for the at least one user via the communication link,
a searching arrangement, to determine positions of the messages in the message memory, for searching the message memory in advance at regular intervals, each interval being greater than one time window, for, in each instance, a plurality of time windows still following, a buffer assigned to the message memory, and a storing arrangement for storing the positions of the messages to be sent or to be received in the plurality of time windows still following, in the buffer as a result of a search run.

21. The communication system of claim 20, wherein the arrangement for searching the message memory and the arrangement for storing the positions of the determined messages in the buffer are in the form of a finite state machine.

* * * * *